United States Patent
Lee

(10) Patent No.: US 10,509,818 B2
(45) Date of Patent: Dec. 17, 2019

(54) METHOD FOR COLLECTING MULTIMEDIA INFORMATION AND DEVICE THEREOF

(71) Applicant: SAMSUNG ELECTRONICS CO., LTD., Suwon-si (KR)

(72) Inventor: Nam-suk Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 607 days.

(21) Appl. No.: 14/785,875

(22) PCT Filed: Mar. 23, 2015

(86) PCT No.: PCT/KR2015/002811
§ 371 (c)(1),
(2) Date: Oct. 21, 2015

(87) PCT Pub. No.: WO2015/142136
PCT Pub. Date: Sep. 24, 2015

(65) Prior Publication Data
US 2016/0110358 A1 Apr. 21, 2016

(30) Foreign Application Priority Data

Mar. 21, 2014 (KR) .................. 10-2014-0033706
Mar. 2, 2015 (KR) .................. 10-2015-0029104

(51) Int. Cl.
*G06F 17/30* (2006.01)
*G06F 16/48* (2019.01)
(Continued)

(52) U.S. Cl.
CPC .......... *G06F 16/489* (2019.01); *G06F 16/248* (2019.01); *G06F 16/40* (2019.01); *G06Q 10/109* (2013.01)

(58) Field of Classification Search
None
See application file for complete search history.

(56) References Cited

U.S. PATENT DOCUMENTS 6,088,026 A * 7/2000 Williams .......... G06F 17/30017
707/E17.009
6,380,959 B1 * 4/2002 Wang .................. G06Q 10/109
715/853
(Continued)

FOREIGN PATENT DOCUMENTS

CN 102123343 A 7/2011
CN 103369139 A 10/2013
(Continued)

OTHER PUBLICATIONS

Communication dated Feb. 28, 2017, issued by the European Patent Office in counterpart European application No. 15765204.1.
(Continued)

*Primary Examiner* — Hung D Le
(74) *Attorney, Agent, or Firm* — Sughrue Mion, PLLC

(57) ABSTRACT

A device includes a storage configured to store a schedule of a user, the schedule including one or more events. The device further includes a communication interface configured to request an external device for multimedia data of an event in the schedule, based on time information of the event, and receive the multimedia data from the external device. The device further includes a controller configured to provide the multimedia data.

20 Claims, 37 Drawing Sheets

(51) Int. Cl.
  *G06F 16/40* (2019.01)
  *G06F 16/248* (2019.01)
  *G06Q 10/10* (2012.01)

(56) References Cited

U.S. PATENT DOCUMENTS

| | | | | |
|---|---|---|---|---|
| 7,620,914 | B2* | 11/2009 | Li | H04N 5/445 |
| | | | | 715/854 |
| 2003/0159150 | A1* | 8/2003 | Chernock | H04N 5/445 |
| | | | | 725/58 |
| 2008/0059618 | A1* | 3/2008 | May | G06Q 10/109 |
| | | | | 709/223 |
| 2009/0100332 | A1* | 4/2009 | Kanjilal | G06Q 10/107 |
| | | | | 715/235 |
| 2010/0094529 | A1* | 4/2010 | Gupta | G06Q 10/02 |
| | | | | 701/117 |
| 2013/0117365 | A1* | 5/2013 | Padmanabhan | H04L 67/10 |
| | | | | 709/204 |
| 2013/0212494 | A1* | 8/2013 | Heiferman | G06Q 10/1095 |
| | | | | 715/753 |
| 2013/0325859 | A1 | 12/2013 | Porter et al. | |
| 2013/0347037 | A1* | 12/2013 | Soroushian | H04N 21/26258 |
| | | | | 725/39 |
| 2014/0122471 | A1* | 5/2014 | Houston | G06F 17/3089 |
| | | | | 707/731 |
| 2014/0270712 | A1* | 9/2014 | Bennett | H04N 21/4583 |
| | | | | 386/292 |
| 2016/0164974 | A1* | 6/2016 | Lavee | H04L 67/125 |
| | | | | 707/722 |

FOREIGN PATENT DOCUMENTS

| | | |
|---|---|---|
| JP | 2004-62773 A | 2/2004 |
| KR | 10-1230462 B1 | 2/2013 |
| WO | 2009/070841 A1 | 6/2009 |
| WO | 2013/015317 A1 | 1/2013 |

OTHER PUBLICATIONS

Communication dated Apr. 19, 2017, issued by the Korean Intellectual Property Office in counterpart Korean application No. 10-2017-0011093.

International Search Report and Written Opinion dated Jun. 1, 2015 by The International Searching Authority in International Application No. PCT/KR2015/002811, (PCT/ISA/220, PCT/ISA/210 and PCT/ISA/237).

Communication dated Feb. 16, 2016, issued by the Korean Intellectual Property Office in corresponding Korean Application No. 10-2015-0029104.

Google, "How to share a meeting schedule with Google Apps' know-how and Google Calendar, and how to reserve a meeting place", http://googler.pe.kr/wordpress/index.php/archives/8089 (published on Feb. 1, 2012).

Communication dated Oct. 31, 2017 by the Korean Intellectual Property Office in counterpart Korean Application No. 10-2017-0011093.

Communication dated Apr. 25, 2018, issued by the State Intellectual Property Office of P.R. China in counterpart Chinese Application No. 201580001464.7.

* cited by examiner

METHOD FOR COLLECTING MULTIMEDIA INFORMATION AND DEVICE THEREOF

CROSS-REFERENCE TO RELATED APPLICATIONS

This application is a U.S. national stage application under 35 USC 371 of International Application No. PCT/KR2015/002811, filed on Mar. 23, 2015, in the Korean Intellectual Property Office, which claims priority from Korean Patent Application No. 10-2014-0033706, filed on Mar. 21, 2014, in the Korean Intellectual Property Office, and Korean Patent Application No. 10-2015-0029104, filed on Mar. 2, 2015, in the Korean Intellectual Property Office, the disclosures of which are incorporated herein by reference in their entireties.

BACKGROUND

1. Field

Methods and apparatus consistent with exemplary embodiments of the present application relate to a method of collecting multimedia information and a device thereof.

2. Description of the Related Art

Multimedia information may include at least one of a still image, text, graphics, a sound, a moving picture, and an animation, but is not limited thereto.

In general, the multimedia information may be directly collected by a user. For example, the user may collect a still image or a moving picture by using a capture function of a camera.

However, multimedia information that is collectable by using the multimedia information collecting method has a limitation. For example, it may be difficult to collect multimedia information about an event that the user did not participate in. Therefore, there is a need for a method of easily collecting various multimedia information.

SUMMARY

Aspects of exemplary embodiments relate to a method and a device for collecting multimedia information stored in an external device.

Aspects of exemplary embodiments relate to a method and a device for collecting multimedia information disclosed in a social network service (SNS) server.

Aspects of exemplary embodiments relate to a method and a device for collecting multimedia information by using information stored in an external device or/and personal information stored in a device.

Aspects of exemplary embodiments relate to a method and a device for collecting multimedia information by using SNS-based information or/and personal information of a user.

According to an aspect of an exemplary embodiment, there is provided a device including a storage configured to store a schedule of a user, the schedule including one or more events. The device further includes a communication interface configured to request an external device for multimedia data of an event in the schedule, based on time information of the event, and receive the multimedia data from the external device. The device further includes a controller configured to provide the multimedia data.

The event may be an event in which the user did not participate.

The controller may be further configured to determine time information and location information of the one or more events, and compare the time information and the location information of the one or more events with time information and location information of the device to determine the event in which the user did not participate.

The controller may be further configured to determine overlapping events among the one or more events included in the stored schedule or among at least one event included in a schedule that is received from the external device, and determine, among the overlapping events, the event in which the user did not participate.

The communication interface may be further configured to receive, from the external device, participant information of the event in which the user did not participate, and the device may further include a display configured to display the participant information.

The controller may be further configured to receive an input selection of identification information of another device in which the multimedia data of the event in which the user did not participate is to be searched, the communication interface may be further configured to transmit the identification information of the other device to the external device, and the received multimedia data may be found among multimedia data that is transmitted from the other device to the external device.

The device may further include a display configured to display the received multimedia data, and a user interface configured to receive an input selection of a piece of the displayed multimedia data. The storage may be further configured to store the piece of the displayed multimedia data.

The storage may be further configured to store multimedia data of the user, and the controller may be further configured to provide the stored multimedia data.

According to an aspect of another exemplary embodiment, there is provided a method of collecting multimedia data, the method being performed by a device, the method including storing a schedule of a user, the schedule including one or more events. The method further includes requesting an external device for multimedia data of an event in the schedule, based on time information of the event, and receiving the multimedia data from the external device. The method further includes providing the multimedia data.

The method may further include determining time information and location information of the one or more events, and comparing the time information and the location information of the one or more events with time information and location information of the device to determine the event in which the user did not participate.

The method may further include determining overlapping events among the one or more events in the stored schedule or among at least one event included in a schedule that is received from the external device, and determining, among the overlapping events, the event in which the user did not participate.

The method may further include receiving, from the external device, participant information of the event in which the user did not participate, and displaying the participant information.

The method may further include receiving an input selection of identification information of another device in which the multimedia data of the event in which the user did not participate is to be searched for, and transmitting the identification information of the other device to the external device. The received multimedia data may be found among multimedia data that is transmitted from the other device to the external device.

The method may further include displaying the received multimedia data, receiving an input selection of a piece of the displayed multimedia data, and storing the piece of the displayed multimedia data.

The method may further include storing multimedia data of the user, and providing the stored multimedia data.

According to an aspect of another exemplary embodiment, there is provided a device including a controller configured to select an event in a schedule of a user, and set a range in which multimedia data of the event is to be searched for. The device further includes a communication interface configured to request an external device for the multimedia data, transmit the range to the external device, and receive, from the external device, the multimedia data that is found in the range. The controller is further configured to provide the multimedia data.

The controller may be further configured to select the event based on an input selection of the event.

The range may include at least one among identification information of another device in which the multimedia data is to be searched for, a type of the multimedia data, a period of time of the multimedia data, location information of the event, and a person included in the multimedia data.

It is possible to easily collect multimedia information about an event that a user did not participate in, and to use the collected information as life-log information of the user.

DETAILED DESCRIPTION OF THE EXEMPLARY EMBODIMENTS

Figure 1:
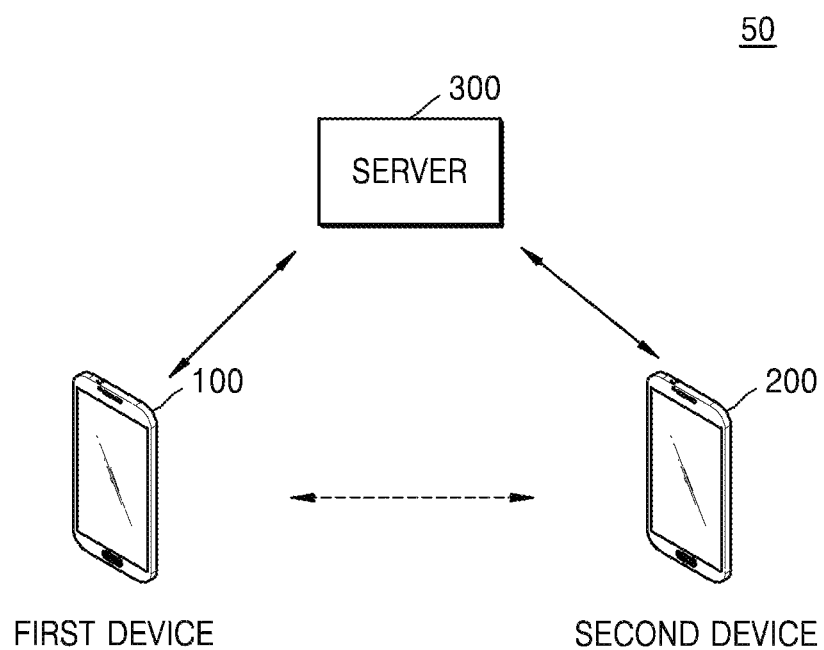
FIG. 1 is a diagram illustrating a multimedia information collecting system, according to an exemplary embodiment of the inventive concept.

Hereinafter, terms that are used in the specification will be briefly described, and the inventive concept will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the inventive concept. Thus, the terms used herein have to be defined based on the meaning of the terms together with the description throughout the specification.

Also, when a part "includes" or "comprises" an element, unless there is a description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

One or more exemplary embodiments of the inventive concept will now be described more fully with reference to the accompanying drawings. However, the inventive concept may be embodied in many different forms, and should not be construed as being limited to the exemplary embodiments set forth herein. In the following description, well-known functions or constructions are not described in detail because they would obscure the one or more exemplary embodiments with unnecessary detail, and like reference numerals in the drawings denote like or similar elements throughout the specification.

FIG. 1 is a diagram illustrating a multimedia information collecting system, according to an exemplary embodiment of the inventive concept.

Referring to FIG. 1, a multimedia information collecting system 50 according to the present exemplary embodiment of the inventive concept may include a first device 100, a second device 200, and a server 300.

The first device 100 and the second device 200 according to the present exemplary embodiment of the inventive concept may be embodied in various forms.

For example, the first device 100 and the second device 200 may include portable devices, wearable devices, home internet appliances, mobile devices, or the like and are not limited thereto.

The portable devices may include a mobile phone, a smart phone, a notebook, a laptop computer, a tablet PC, an electronic book terminal, a terminal for digital broadcasting, a personal digital assistant (PDA), a portable multimedia player (PMP), navigation, an MP3 player, a digital camera, etc. but are not limited thereto.

The wearable devices may include glasses, a watch, a band (e.g., a waistband, a hairband, etc.), various types of accessories (e.g., a ring, a bracelet, an anklet, a hair pin, a necklace, etc.), various types of body pads (e.g., a knee pads, and elbow pad), shoes, gloves, clothes, a hat, devices that are usable as an artificial leg for a disabled person, an artificial hand for a disabled person, etc. but are not limited thereto.

The home internet appliances may include home devices such as a smart TV, a personal computer (PC), a desktop personal computer (PC), a refrigerator, a washing machine, a lighting equipment, or the like that form machine to machine (M2M) or internet of things (IoT), but are not limited thereto.

The mobile devices may include home devices such as vehicles that form machine to machine (M2M) or internet of things (IoT), but are not limited thereto.

The server 300 according to the present exemplary embodiment of the inventive concept may be embodied in various forms. For example, the server 300 may be a social network service (SNS) server that provides an SNS or a multimedia information database, but are not limited thereto.

The server 300 according to the present exemplary embodiment of the inventive concept may include a cloud server, and a first device user and a second device user may store multimedia information in the cloud server, and may use the multimedia information by accessing the cloud server.

The first device 100 and the second device 200 according to the present exemplary embodiment of the inventive concept may include a communication interface for communicating with an external device or the server 300. The first device 100 may communicate with the server 300 or the second device 200 via the communication interface, and the second device 200 may communicate with the server 300 or the first device 100 via the communication interface.

Accordingly, the first device 100 or the second device 200 may transmit multimedia information to the server 300. For example, the multimedia information may include a still image, a text, graphics, a sound, a moving picture, and an animation, but is not limited thereto.

Also, the server 300 according to the present exemplary embodiment of the inventive concept may communicate with the first device 100 or the second device 200. For example, the server 300 may receive user authentication information, device identification information, or the like from the first device 100 or the second device 200. Accordingly, the server 300 may recognize a user of the first device 100 or the second device 200 via the user authentication information, and may identify the first device 100 or the second device 200 via the device identification information.

Here, the user authentication information may include a user's identification (ID), a user's password, a user's account, or the like, and the server 300 may identify a user of the first device 100 or a user of the second device 200 via the user authentication information.

Also, the server 300 may receive the multimedia information from the first device 100 or the second device 200, and may store and manage the received multimedia information. For example, the multimedia information stored in the server 300 may include multimedia information (e.g., multimedia information, comments, or the like that are posted by the first device 100 or the second device 200) transmitted by the first device 100 or the second device 200.

Also, when the server 300 receives, from the first device 100 or the second device 200, a request for multimedia information related to an event, the server 300 may search for the multimedia information related to the event from among a plurality of pieces of stored multimedia information, and may transmit the found multimedia information to the first device 100 or the second device 200 that requested the multimedia information.

Also, the first device 100 and the second device 200 may store and manage personal information including schedules of a device user. For example, the first device 100 and the second device 200 may store and manage the schedules of the device user by using an application such as a personal information management system (PIMS) application or a life-log application.

The PIMS application denotes an application that allows first device and second device users to easily manage personal information. For example, the PIMS application may include a memo application, a calendar application, a schedule management application, a diary application, a contact information application, or the like.

Alternatively, the first device and second device users may not install the PIMS application in a device but may access a website providing a PIMS service, and may store and manage personal information in the website.

A life-log is a term combining the words "life" (a living) and "log" (a record or a story), and life-log information may include events related to schedules of a first device user, and a plurality of pieces of multimedia information related to the events recorded to (stored in) the first device 100. For example, the life-log information may include identification information of an event (an event title), time information of the event, location information, and multimedia information that is related to the event and is collected from a device or another device. Also, the first device 100 may arrange, based on time information of the events, the plurality of pieces of multimedia information related to the events included in the life-log information, and may display the plurality of pieces of multimedia information.

Also, the life-log information may include a plurality of pieces of multimedia information (e.g., a picture and a moving picture captured by a user, a memo, etc.) that are collected in a daily life by the first device user and are recorded to (stored in) the first device 100 while the plurality of pieces of multimedia information are irrelevant to the schedules.

The life-log application denotes an application that allows the first device user to store and manage the life-log information, and the life-log information may be stored and managed via a plurality of applications including a first application and a second application.

The plurality of applications may interoperate with each other and thus may integrally manage the life-log information. For example, events and a plurality of pieces of multimedia information related to the events that are stored by using the first application may be displayed via the second application.

Accordingly, the first device 100 according to the present exemplary embodiment of the inventive concept may store and manage, as life-log information of the first device user, multimedia information of a user of an external device (the second device 200) that is received from the server 300, by using the life-log application.

Referring to FIG. 1, the multimedia information collecting system includes the first device 100, the second device 200, and the server 300, but is not limited thereto, and the system may be embodied with more or less elements than the elements shown in FIG. 1.

Figure 2:
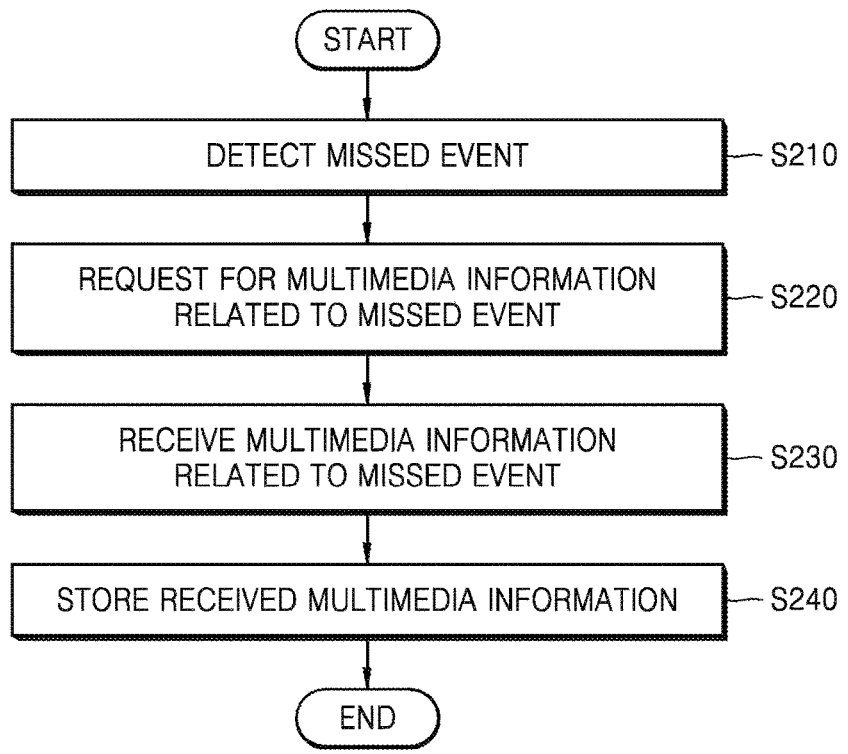
FIGS. 2 and 3 are flowcharts illustrating a method of collecting multimedia information, the method being performed by a first device, according to exemplary embodiments of the inventive concept.
Figure 3:
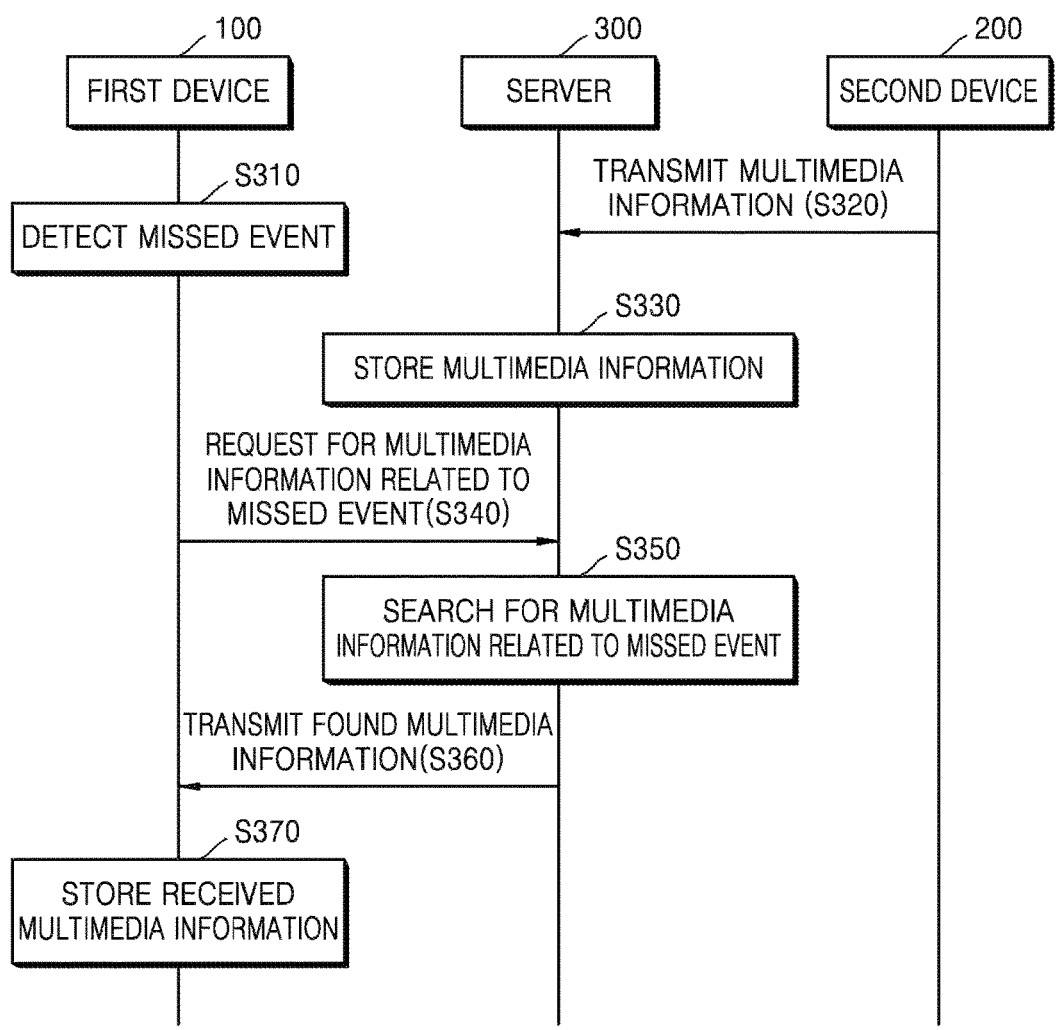
Figure 4:
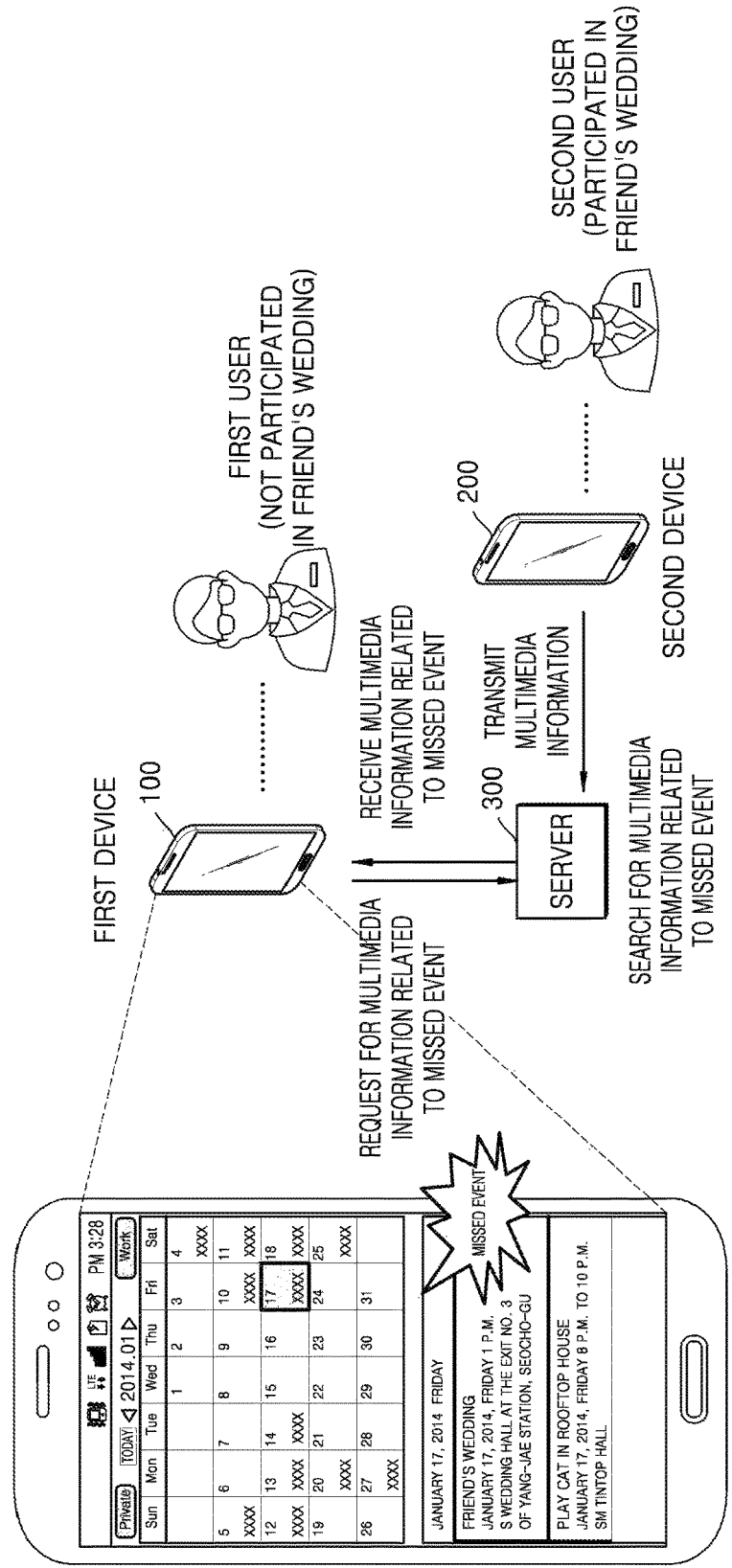
FIG. 4 is a diagram related to FIGS. 2 and 3.

FIGS. 2 and 3 are flowcharts illustrating a method of collecting multimedia information, the method being performed by a first device, according to exemplary embodiments of the inventive concept, and FIG. 4 is a diagram related to FIGS. 2 and 3.

Hereinafter, for convenience of description, it is assumed that the first device 100 is a device that requests the server 300 for multimedia information related to a missed event, and the second device 200 is a device that transmitted, to the server 300, the multimedia information related to the missed event. However, the inventive concept is not limited thereto.

Referring to FIGS. 2 and 3, the first device 100 according to the present exemplary embodiment of the inventive concept may detect a missed event from among schedules registered in the first device 100 or schedules received from an external device (S210 and S310).

The first device 100 may detect the missed event from among the schedules registered in a PIMS application or a life-log application that is installed in the first device 100, or may detect the missed event from among the schedules received from the external device including an SNS server or a cloud server of a first device user. Here, the external device may indicate the server 300 of FIG. 3.

Here, the schedules received from the external device may include schedules of the first device user registered in the external device, or schedules of the first device user extracted from the external device.

For example, schedules of the first device user extracted from the SNS server may include a schedule (e.g. a project meeting) that is extracted by analyzing information or a comment posted on the SNS server. Here, the information or the comment posted on the SNS server may include information linked to an SNS page of the first device user stored in the SNS server, or to a base page of an SNS. The information linked to the SNS page or the base page of the SNS may include another person's posted writing or another person's posted comment. Also, the SNS server may analyze the other person's posted writing or comment by a unit of a word and may extract the schedule of the first device user.

Also, the SNS server may transmit, to the first device 100, information about the schedule that is registered in the SNS server or is extracted from the SNS server. The information about the schedule may include time information, location information, participant information, etc. of the schedule, and the first device 100 may detect whether the schedule is the missed event, based on the received information about the schedule.

The first device 100 may detect a non-participation schedule, i.e., the missed event from among the schedules registered in the first device 100 and the schedules received from the external device, wherein the non-participation schedule indicates an event in which the first device user did not participate.

Hereinafter, for convenience of description, the schedules registered in the first device 100 are mainly described, but the inventive concept is not limited thereto, and thus descriptions below may be equally applied to the schedules received from the external device.

The missed event may be automatically detected, based on a plurality of pieces of information (e.g., time information, location information, etc. about a first schedule) about the schedules registered in the first device 100, status information of the first device 100 (e.g., location information of the first device 100 according to time, etc.) sensed by the first device 100, multimedia information stored in the first device 100, or the like. A method of detecting the missed event will be described in detail with reference to FIGS. 5 through 7.

When a schedule registered in the first device 100 or a schedule received from the external device is ended, the first device 100 may determine whether a first user participated in the schedule, and may detect whether the schedule is the missed event. Alternatively, the first device 100 may periodically scan an ended schedule from among the registered schedules, may determine whether the first user participated in the ended schedule, and thus may detect whether the registered schedule is the missed event. However, the inventive concept is not limited thereto.

Alternatively, the missed event may be set by an input of the first device user. For example, the first user may directly select, from the schedules registered in the first device 100, a schedule in which the first user did not participate, and may set the schedule as the missed event.

Also, the missed event may include a schedule in which the first device user did not participate and a schedule in which the first user partly participated, from among the schedules registered in the first device 100.

The first device 100 may request the server 300 for multimedia information related to the missed event (S220 and S340). For example, when the missed event is detected, the first device 100 may automatically request the multimedia information related to the missed event.

Here, the first device 100 may request the multimedia information related to the missed event, after the schedule detected as the missed event is ended or after the schedule is ended and then a preset time period elapses. However, the inventive concept is not limited thereto.

Alternatively, the first device 100 may request the multimedia information related to the missed event, based on a user input.

Alternatively, the first device 100 may transmit, to the server 300, the request for the multimedia information and information about the missed event. The information about the missed event may include time information, location information, an event title, participant information, etc., of the missed event.

For example, as illustrated in FIG. 4, in a case where the missed event is a friend's wedding, the information about the missed event may include location information of the wedding (e.g., S Wedding Hall at exit no. 3 of Yang-jae station, Seocho-gu), time information of the wedding (wedding start time information and end time information, e.g., Jan. 14, 2011, Saturday, 1 p.m. to 3 p.m.), a name of the friend getting married, information about participants in the friend's wedding, etc.

The information about the missed event may further include information about a primary object (or a person)

related to the missed event, and if the missed event is about the schedule in which the first device user partly participated, the information about the missed event may include information about a time in which the first device user participated. However, the inventive concept is not limited thereto.

Here, the first device 100 may automatically detect the information about the missed event from schedule information corresponding to the missed event, or may obtain the information about the missed event, according to a user input. Also, a plurality of pieces of the information about the missed event are detected, the first device 100 may display the plurality of pieces of detected information about the missed event, and may transmit, to the server 300, information that is selected, by a user, from among the plurality of pieces of displayed information. However, the inventive concept is not limited thereto, and the first device 100 may transmit all of the plurality of pieces of detected information about the missed event to the server 300.

The server 300 may search for the multimedia information related to the missed event (S350), and may transmit found multimedia information related to the missed event to the first device 100 (S360). An operation (S350) of searching for the multimedia information related to the missed event will be described in detail at a later time.

The first device 100 may store the received multimedia information as life-log information of the first device user (S240 and S370). The first device 100 may automatically store the received multimedia information, or may store the received multimedia information according to a storage request by the first user, and may manage the received multimedia information as the life-log information of the first device user by storing the received multimedia information in the PIMS application or the life-log application installed in the first device 100.

Accordingly, the first device user may even store, as the life-log information, the multimedia information about the schedule (the missed event) in which the first device user did not participate.

Alternatively, the first device 100 may store the received multimedia information in the external device including the SNS server (e.g., the SNS page of the first device user), the cloud server of the first device user, a wearable device interoperating with the first device 100, or the like.

Also, the first device 100 may display the life-log information of the first device user via a preset application (e.g., the PIMS application, the life-log application, etc.), and may display the multimedia information related to the missed event, which is received from the server 300, according to the time information of the missed event. This will be described in detail with reference to FIG. 14.

Referring to FIG. 3, the second device 200 according to the present exemplary embodiment of the inventive concept may transmit multimedia information to the server 300 (S320). The second device 200 may transmit, to the server 300, the multimedia information that is generated in the second device 200 or is received from external devices. Here, a second device user (hereinafter, referred to as the second user) may be a user related to the missed event.

For example referring to FIG. 4, in a case where the missed event is the friend's wedding, the second user may be a user who participated in the friend's wedding. Also, if the second device user is a participant who participated in the friend's wedding, the multimedia information transmitted from the second device 200 to the server 300 may include multimedia information (e.g., a picture related to the friend's wedding, etc.) related to the friend's wedding.

The server 300 according to the present exemplary embodiment of the inventive concept may store the multimedia information received from the second device 200 (S330). Here, the server 300 may also receive identification information of the second device 200, and may store the multimedia information received from the second device 200 by matching the multimedia information with the identification information of the second device 200.

For example, in a case where the server 300 is the SNS server, the server 300 may store the multimedia information in such a manner that the multimedia information uploaded by the second device user, a comment added by the second device user to another person's bulletin board message, or another person's multimedia information shared by the second device user may be posted on an SNS page of the second device user.

Referring to FIG. 3, only the second device 200 transmits the multimedia information to the server 300, but the inventive concept is not limited thereto, thus, the first device 100 may also transmit multimedia information to the server 300. Also, the server 300 may store the multimedia information received from the first device 100, may also receive identification information of the first device 100 from the first device 100, and then may store the multimedia information received from the first device 100 by matching the multimedia information with the identification information of the first device 100.

The server 300 may search for the multimedia information that is related to the missed event and is requested by the first device 100 (S350).

The server 300 may search for the multimedia information related to the missed event, based on the information (e.g., time information, location information, an event title, participant information, etc., of the missed event) about the missed event which is received from the first device 100.

For example, the server 300 may search for the multimedia information by using, as search words, the event title, the time information, or the location information of the missed event. Alternatively, the server 300 may search for the multimedia information related to the missed event in multimedia information received from a device of a participant of the missed event (the multimedia information of the participant of the missed event), based on information about the participant of the missed event.

Also, the server 300 may recognize a person, a building, a character, etc. included in multimedia information stored in the server 300, may analyze whether the recognized person, the recognized building, or the recognized character is related to the missed event, and may search for the multimedia information related to the missed event.

Also, the server 300 may search for the multimedia information related to the missed event by using metadata of the multimedia information stored in the server 300.

Metadata information of multimedia information may include generation location information of the multimedia information, generation time information of the multimedia information, generation date information of the multimedia information, information about an object included in the multimedia information, information about a person who generated the multimedia information, information (e.g., a friend's wedding, a recital of a child, etc.) about an event related to the multimedia information, and reproduction condition information of the multimedia information (e.g., reproduction program information, reproduction program version information, capacity information, an output mode (e.g., an audio output mode), display size information, etc.), but the inventive concept is not limited thereto.

Also, the information about the object included in the multimedia information may include a name (or a nickname) of a person, a name of a building, a place name, information about a primary object (or a primary person), or the like, but the inventive concept is not limited thereto.

For example, when the server 300 receives an event title of the missed event from the first device 100, the server 300 may search for multimedia information tagged to the event title from among a plurality of pieces of stored multimedia information.

Alternatively, when the server 300 receives the event title of the missed event and the participant information from the first device 100, the server 300 may search for multimedia information tagged to the event title from among a plurality of pieces of multimedia information of the participant of the missed event.

Also, when the server 300 receives the event title of the missed event and information about a primary person in the missed event from the first device 100, the server 300 may search for multimedia information tagged to the event title from among a plurality of pieces of multimedia information of the primary person.

Also, when the server 300 receives the time information and the location information of the missed event from the first device 100, the server 300 may search for, by using the metadata of the stored multimedia information, multimedia information of which generation location information and generation time information match with the time information and the location information of the missed event, the matched multimedia information being from among a plurality of pieces of multimedia information. However, the inventive concept is not limited thereto.

The server 300 may transmit the found multimedia information to the first device 100 (S360), and the first device 100 may store the received multimedia information as a life-log of the first device user (S370).

An operation 360 (S360) corresponds to an operation 230 (S230) of FIG. 2, an operation 370 (S370) corresponds to an operation 240 (S240) of FIG. 2, and thus, detailed descriptions thereof are omitted.

Figure 5:
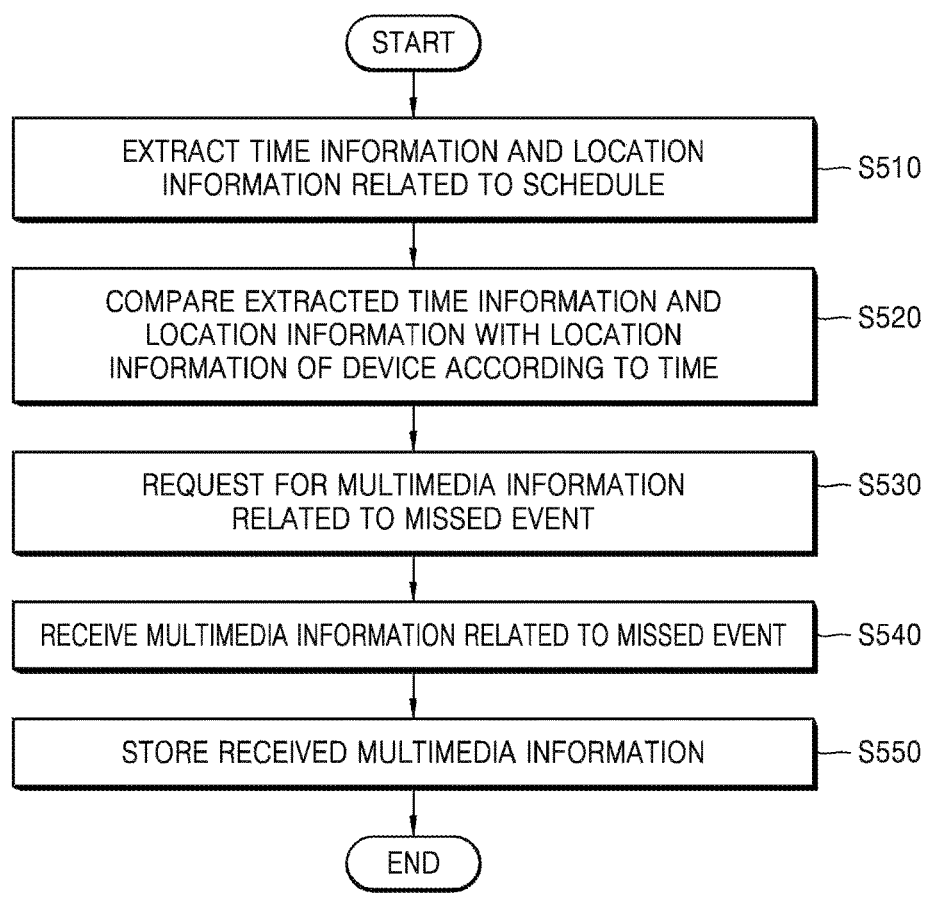
FIG. 5 is a flowchart illustrating a method of detecting a missed event, according to an exemplary embodiment of the inventive concept.

FIG. 5 is a flowchart illustrating a method of detecting a missed event, according to an exemplary embodiment of the inventive concept.

Referring to FIG. 5, the first device 100 according to the present exemplary embodiment of the inventive concept may extract time information and location information related to a schedule registered in the first device 100 or a schedule received from an external device (S510).

Hereinafter, for convenience of description, the schedule registered in the first device 100 is mainly described, but the inventive concept is not limited thereto, and thus descriptions below may be equally applied to the schedule received from the external device.

For example, as illustrated in FIG. 4, when a schedule registered in the PIMS application (e.g., a schedule management application) installed in the first device 100 is the friend's wedding, the first device 100 may extract the time information (the wedding start time information and end time information, e.g., Jan. 14, 2011, Saturday, 1 p.m. to 3 p.m.) and the location information (e.g., S Wedding Hall at exit no. 3 of Yang-jae station, Seocho-gu) that are related to the friend's wedding.

Also, the first device 100 may compare the extracted time information and the extracted location information with location information of the first device 100 according to time, and may detect whether the registered schedule is a missed event (S520).

The first device 100 may include a position sensor for detecting a location of the first device 100. For example, the position sensor may include a global positioning system (GPS), a gyro sensor, an acceleration sensor, an altitude sensor, or the like.

Accordingly, the first device 100 may compare the time information and the location information about the registered schedule with location information sensed according to time, and may detect an event in which a first user participated, an event in which the first user partially participated, and an event in which the first user did not participate. The first device 100 may include, in the missed event, the event in which the first user partially participated and the event in which the first user did not participate, but the inventive concept is not limited thereto.

When time information related to when movement of the first device 100 is stopped (e.g., movement end time information of the first device 100, and movement start time information of the first device 100) includes the time information about the schedule registered in the first device 100 (e.g., the wedding start time information and end time information, e.g., Jan. 14, 2011, Saturday, 1 p.m. to 3 p.m.), and location information of the first device 100 that is obtained, by using the location information sensed in the first device 100, for a time period in which the movement of the first device 100 is stopped is included in a location equal to or similar with the location information about the registered schedule (e.g., S Wedding Hall at exit no. 3 of Yang-jae station, Seocho-gu), the first device 100 may detect the schedule (the friend's wedding) registered in the first device 100, as the event in which the first user participated.

The similar location may include a tolerance by which the first user is determined to have participated in the schedule. The location information may include physical location information including longitude and latitude information, and may also include logical location information (e.g., location information such as home or an office).

In a case where the movement end time information of the first device 100 includes the time information of the schedule (the friend's wedding) registered in the first device 100, and location information of the first device 100 while the movement of the first device 100 is stopped is different from the location information of the schedule (the friend's wedding) registered in the first device 100 or is not included in a location adjacent to the location information, the first device 100 may detect the schedule (the friend's wedding) registered in the first device 100, as the event in which the first user did not participate.

In a case where the movement end time information of the first device 100 partly includes the time information of the schedule (the friend's wedding) registered in the first device 100, and the location information of the first device 100 while the movement of the first device 100 is stopped is same as the location information of the schedule (the friend's wedding) registered in the first device 100 or is included in similar location information, the first device 100 may detect the schedule (the friend's wedding) registered in the first device 100, as the event in which the first user partially participated.

The first device 100 may request the server 300 for multimedia information related to the missed event (S530), and may receive the multimedia information related to the missed event from the server 300 (S540).

Also, the first device 100 may store the received multimedia information (S550).

Operations 530 (S530) through 550 (S550) of FIG. 5 correspond to operations 220 (S220) through 240 (S240) of FIG. 2, and thus, detailed descriptions thereof are omitted.

Figure 6:
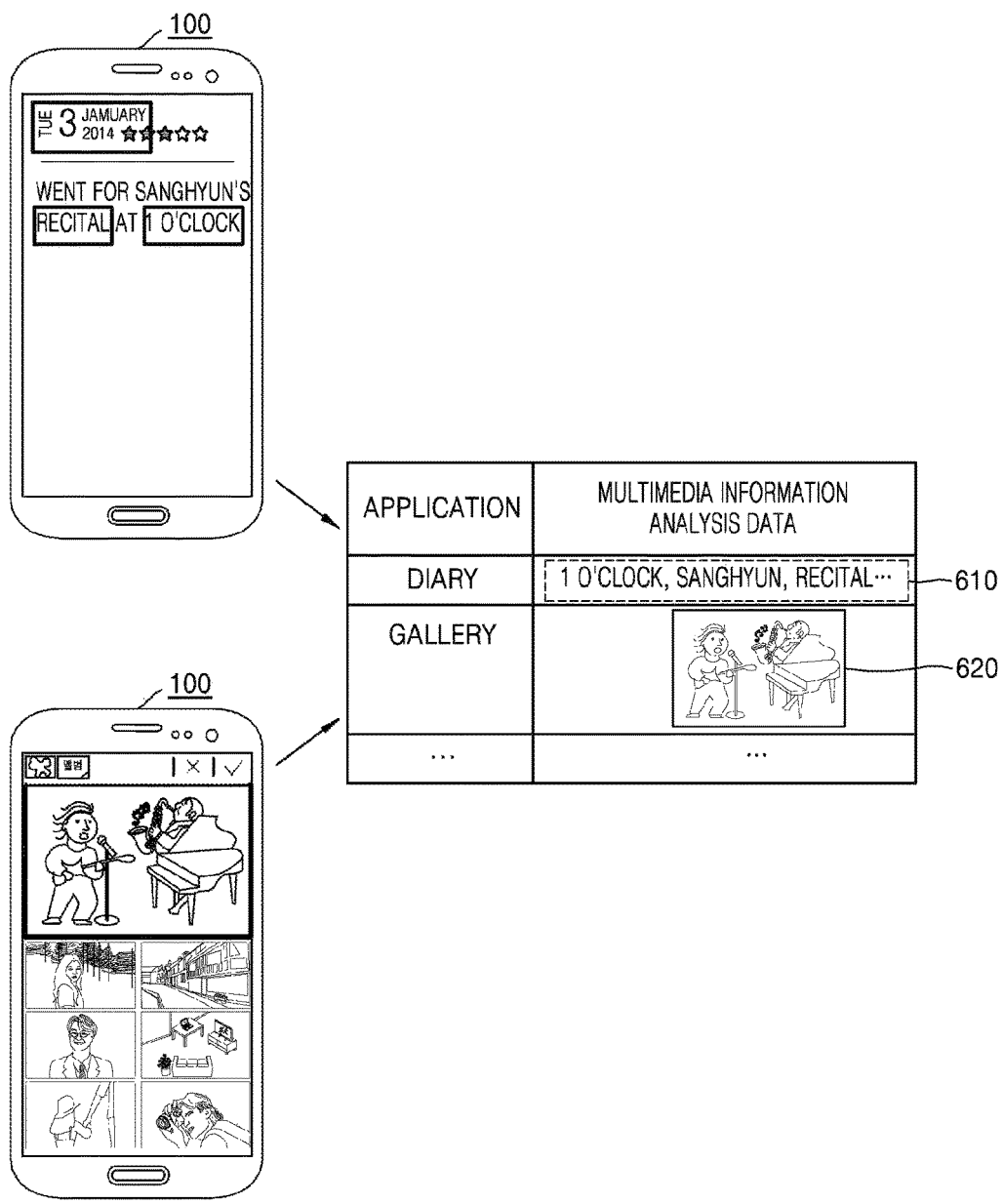
FIGS. 6 and 7 are diagrams illustrating a method of detecting a missed event, according to exemplary embodiments of the inventive concept.

FIG. 6 is a diagram illustrating a method of detecting a missed event, according to an exemplary embodiment of the inventive concept.

Referring to FIG. 6, the first device 100 according to the present exemplary embodiment of the inventive concept may detect whether a schedule registered in the first device 100 is a missed event, based on multimedia information related to life-log information of a first device user that is stored in the first device 100.

The first device 100 may detect whether a schedule registered in the first device 100 is a missed event, by using life-log information of the first device user that is stored in a life-log application (e.g., a diary application) or by using multimedia information stored in a multimedia information management application (e.g., a gallery application).

The first device 100 may detect whether the schedule registered in the first device 100 is the missed event, by using a text, an image, a moving picture, an audio, etc. that are stored in the diary application.

For example, as illustrated in FIG. 4, in a case where the schedule registered in the first device 100 is the friend's wedding, the first device 100 may extract the time information (the wedding start time information and end time information, e.g., Jan. 14, 2011, Saturday, 1 p.m. to 3 p.m.) and the location information (e.g., S Wedding Hall at exit no. 3 of Yang-jae station, Seocho-gu) that are related to the friend's wedding.

The first device 100 may analyze diary text contents of a date (e.g., Jan. 14, 2011) corresponding to the extracted time information of the friend's wedding. As illustrated in FIG. 6, as a result of analyzing the diary text contents, the first device 100 may extract words 610 (e.g., 1 o'clock, Sanghyun, a recital, etc.) related to life-log information (a place where a first user visited and a visit time, things that the first user did, etc.) of the first device user on the date.

The first device 100 may determine, based on the extracted words, whether the first device user participated in the friend's wedding. For example, the first device 100 may determine, based on the extracted words, that the first device user participated in Sanghyun's recital at a time corresponding to a time of the friend's wedding, so that the first device 100 may detect the friend's wedding as the missed event.

Alternatively, the first device 100 may detect whether the schedule registered in the first device 100 is the missed event, by using an image, a moving picture, etc. that are stored in the gallery application.

For example, the first device 100 may analyze an image or a moving picture that was photographed on a date (e.g., Jan. 14, 2011) corresponding to the time information of the friend's wedding, or may analyze an image or a moving picture that was received on the date corresponding to the time information of the friend's wedding.

The first device 100, as illustrated in FIG. 6, may analyze the image or the moving picture stored in the gallery application, or may analyze metadata of the image or the moving picture, so that the first device 100 may determine whether the first device user participated in the friend's wedding on the corresponding date.

For example, the first device 100 may determine that the first device user did not participate in the friend's wedding, based on that an object related to a wedding is not included in an image 620 that was photographed on the date corresponding to the friend's wedding.

Figure 7:
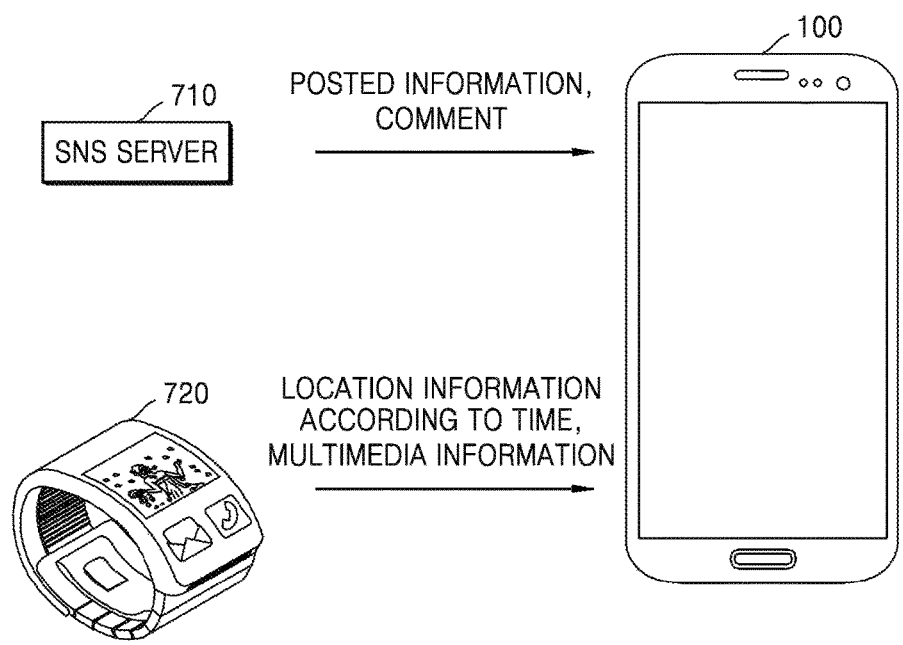

FIG. 7 is a diagram illustrating a method of detecting a missed event, according to an exemplary embodiment of the inventive concept.

Referring to FIG. 7, the first device 100 according to the present exemplary embodiment of the inventive concept may detect whether a schedule registered in the first device 100 is a missed event, based on information received from an external device.

The external device according to the present exemplary embodiment of the inventive concept may include an SNS server 710 and a wearable device 720 of a first device user, but the inventive concept is not limited thereto.

For example, the first device 100 may analyze information (a picture or a moving picture of a place where the first device user visited, a text or a map indicating location information of the first device user, etc.) posted on the SNS server 710 or a comment (e.g., a comment indicating whether the first device user participates in a schedule) posted on the SNS server 710, and thus may detect whether a schedule that was registered, by the first device user, in the first device 100 is the missed event.

Here, the information or the comment posted on the SNS server 710 may include information linked to an SNS page of the first device user which is stored in an SNS server, or to a base page of an SNS. The information linked to the SNS page or the base page of the SNS may include another person's posted writing or another person's posted comment.

For example, the first device 100 may extract a time when a text or a map indicating a location of the first device user was uploaded, and may analyze the text or the map indicating the location of the first device user, so that the first device 100 may extract location information of the first device user according to time. Accordingly, the first device 100 may compare the extracted location information of the first device user according to time with time information and location information related to the schedule registered in the first device 100, and thus may determine whether the first device user participates in the schedule.

Here, a method of comparing the location information of the first device user according to time with the time information and the location information related to the schedule, and thus determining whether the first device user participates in the schedule is same as a method of comparing the location information of the first device according to time with the time information and the location information related to the schedule, and thus determining participation in the schedule, as described in FIG. 5, therefore, detailed descriptions thereof are omitted.

The first device 100 may analyze, by a unit of a word, the comment indicating whether the first device user participates in the schedule, and thus may determine whether the first device user participates in the schedule.

For example, the first device 100 may receive location information of the wearable device 720 according to time from the wearable device 720 of the first device user, and may detect whether the schedule registered in the first device 100 is the missed event.

For example, in a case where the first device user wears the wearable device 720 and participates in the schedule registered in the first device 100, the wearable device 720 may transmit, to the first device 100, the location information of the wearable device 720 according to time.

Accordingly, the first device 100 may compare the location information of the wearable device 720 according to time, which is received from the wearable device 720 of the first device user, with the time information and the location information related to the schedule registered in the first device 100, and thus may determine whether the first device user participated in the schedule registered in the first device 100.

A method of comparing the location information according to time received from the wearable device 720 with the time information and the location information related to the schedule, and thus determining participation in the schedule is same as a method of comparing the location information of the first device according to time with the time information and the location information related to the schedule, and thus determining participation in the schedule, as described in FIG. 5, therefore, detailed descriptions thereof are omitted.

While the location information according to time received from the wearable device 720 is described above, the inventive concept is not limited thereto and may be equally applied to a portable device (e.g., a notebook computer, etc.) of the first device user.

Also, the first device 100 may receive multimedia information related to a life-log of the first device user from the wearable device 720 of the first device user, and may detect, based on the received information, whether the schedule registered in the first device 100 is the missed event.

A method of analyzing the multimedia information related to the life-log of the first device user, which is received from the wearable device 720, and thus determining participation in the schedule is same as a method of analyzing the multimedia information related to a life-log of the first device user stored in the first device 100, and thus determining participation in the schedule, as described in FIG. 6, therefore, detailed descriptions thereof are omitted.

Figure 8:
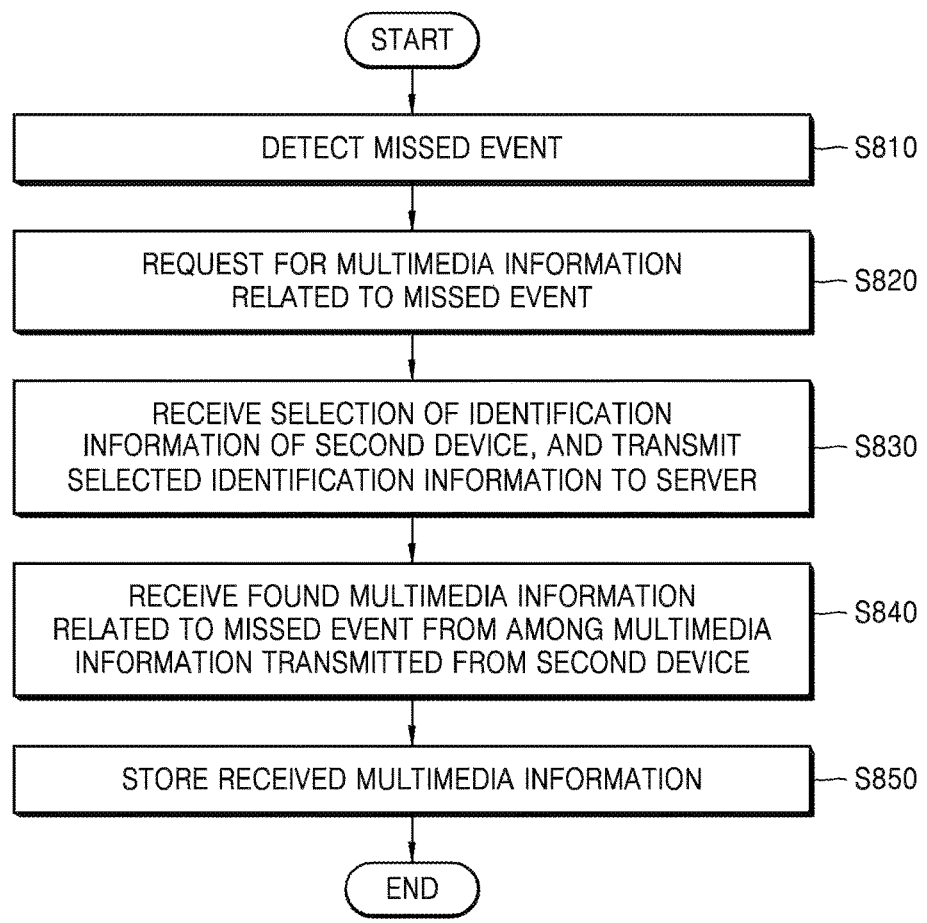
FIG. 8 is a flowchart illustrating a method of setting a search range of multimedia information, according to an exemplary embodiment of the inventive concept.
Figure 9:
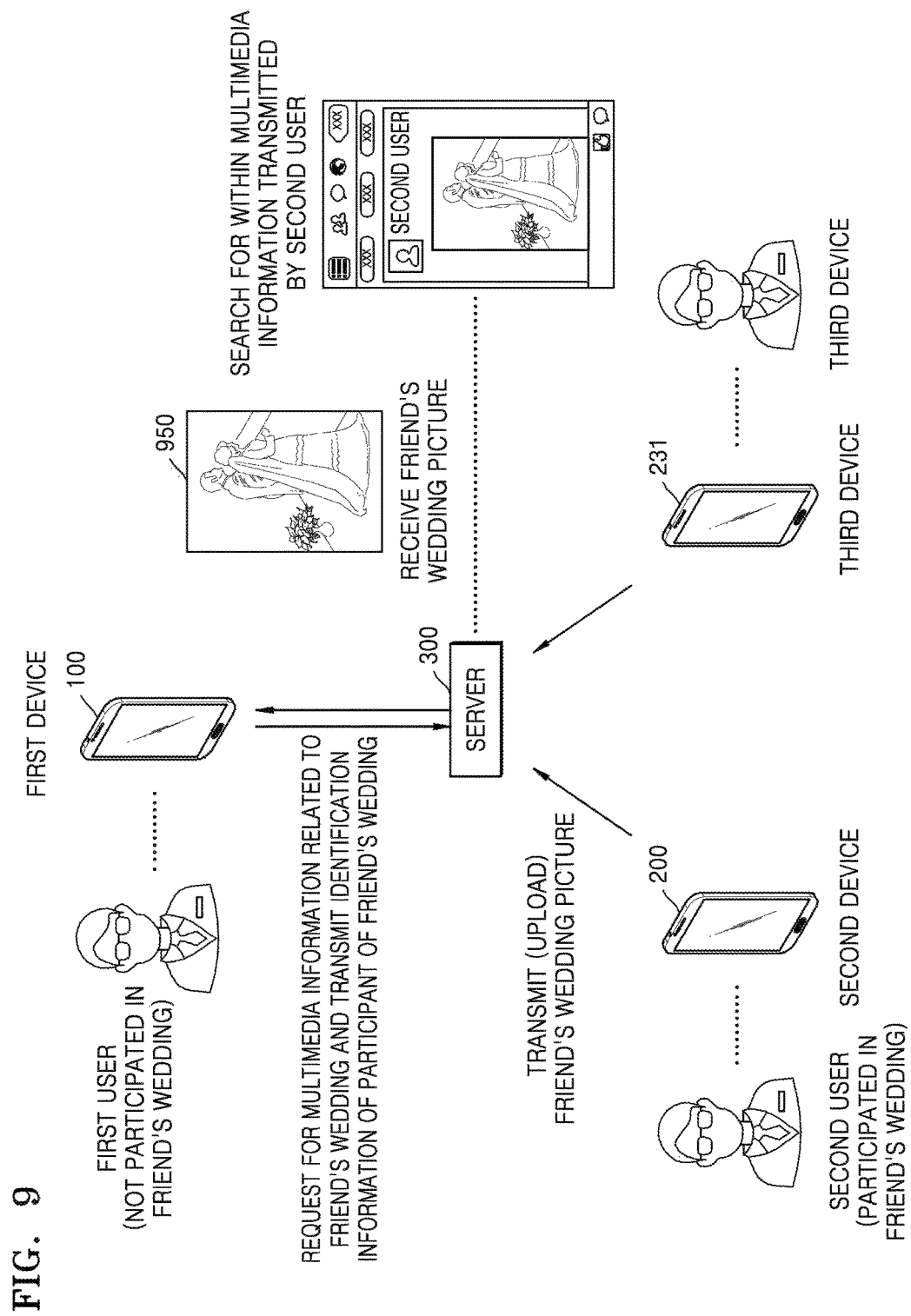
FIG. 9 is a diagram related to FIG. 8.

FIG. 8 is a flowchart illustrating a method of setting a search range of multimedia information, according to an exemplary embodiment of the inventive concept, and FIG. 9 is a diagram related to FIG. 8.

Operations 810 (S810) and 820 (S820) of FIG. 8 correspond to operations 210 (S210) and 220 (S220) of FIG. 2, and thus, detailed descriptions thereof are omitted.

The first device 100 may receive selection of identification information of the second device 200, and may transmit the selected identification information to a server (S830).

For example, the first device 100 may receive an input of selecting the other party with respect to which missed event-related multimedia information is to be searched for, and may set a search range to search for event-related multimedia information within a plurality of pieces of multimedia information that were transmitted from the selected other party to the server 300.

The first device 100 may receive selection of identification information of the other party in which the missed event-related multimedia information is to be searched for, and may receive selection of at least one from among a plurality of pieces of external device identification information registered in the first device 100. A method of selecting the identification information of the other party in which the missed event-related multimedia information is to be searched for will be described in detail with reference to FIGS. 10 and 11.

The other party in which the missed event-related multimedia information is to be searched for may be a participant of the missed event. For example, as illustrated in FIG. 9, when the missed event is a friend's wedding, the first device 100 may receive selection of identification information of a device (the second device 200) of a second user who is a participant of the friend's wedding.

The first device 100 may transmit, to the server 300, the identification information (e.g., a name, an ID, etc. of the second user) of the selected other party or identification information (e.g., a telephone number of the second device) of the other device.

When the server 300 receives, from the first device 100, the identification information of the second device user or the identification information of the second device 200, as illustrated in FIG. 9, the server 300 may search for the missed event-related multimedia information only in multimedia information received from the second device 200 from among multimedia information received from a second user device 200 and multimedia information received from a third user device 231.

For example, the server 300 may search for multimedia information related to the friend's wedding only in multimedia information (e.g., multimedia information, etc. that were uploaded to an SNS page of the second user) that was transmitted to the server 300 from the device of the second user that is the participant of the friend's wedding, and as illustrated in FIG. 9, a friend's wedding picture 950 that was uploaded to the SNS page of the second user may be extracted as the missed event-related multimedia information.

The first device 100 may receive the found multimedia information (e.g., the friend's wedding picture 950) related to the missed event from among the multimedia information transmitted from the second device 200, from the server 300 (S840), and may store the received multimedia information as life-log information of the first device user (S850).

An operation 850 (S850) of FIG. 8 corresponds to an operation 240 (S240) of FIG. 2, and thus, detailed descriptions thereof are omitted.

Figure 10:
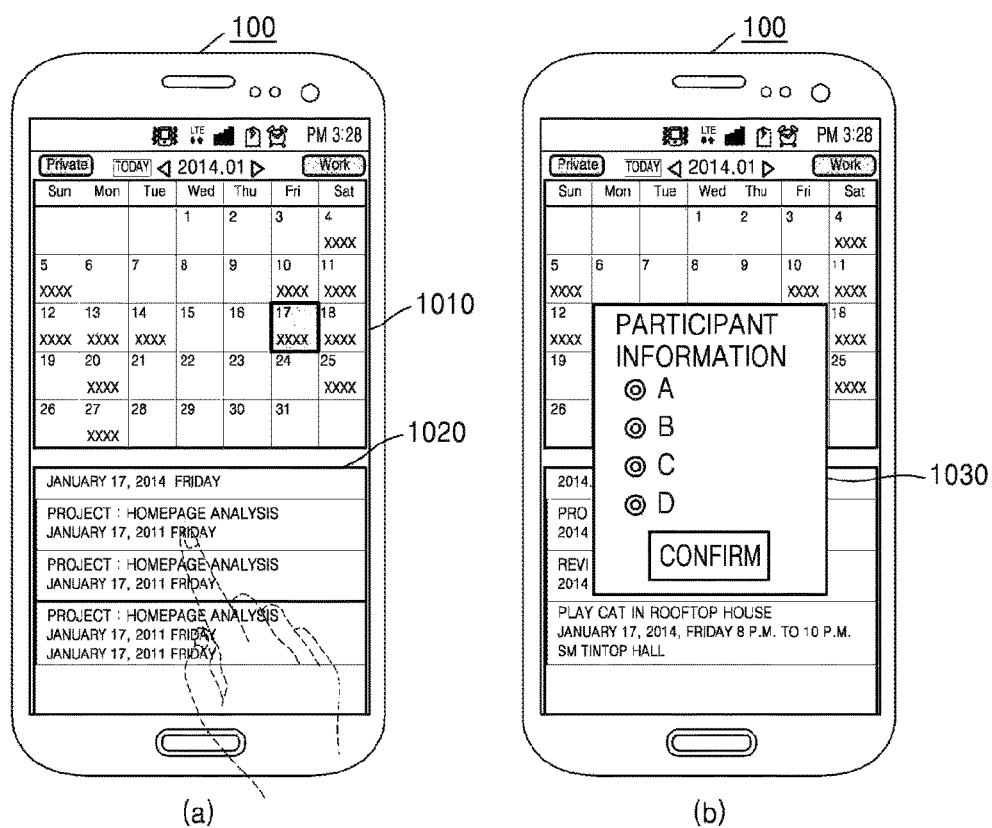
FIGS. 10 and 11 are diagrams illustrating a method of setting another party in which multimedia information related to a missed event is to be searched for, according to exemplary embodiments of the inventive concept.

FIG. 10 is a diagram illustrating a method of setting another party in which multimedia information related to a missed event is to be searched for, according to an exemplary embodiment of the inventive concept.

Referring to FIG. 10, the first device 100 according to the present exemplary embodiment of the inventive concept may receive participant information related to the missed event from an external device, may select at least one of users displayed in the received participant information, and may set the one as the other party in which the multimedia information is to be searched for. Hereinafter, the method is described in detail.

Referring to part (a) of FIG. 10, when a schedule management application (e.g., a calendar application) is executed, the first device 100 may display, on an application execution screen, a schedule registered in the first device 100 or a schedules list received from the external device.

Also, as illustrated in part (a) of FIG. 10, when a first device user selects a date from a calendar screen 1010 on which a month is displayed, a schedules list 1020 registered in the corresponding date may be displayed.

When the first device user selects at least one schedule from the displayed schedules list, the first device 100, as illustrated in part (b) of FIG. 10, may display information of participants who participated in the selected schedule.

For example, the first device 100 may receive participant information of a schedule registered in the first device 100 from the external device (e.g., an SNS server, etc.), and when the first device 100 receives schedule information from the external device, the first device 100 may also receive the participant information of the schedule.

For example, when the external device is the SNS server, the SNS server may analyze information or a comment posted on the SNS server, and thus may extract who participated in the schedule. Here, the information or the comment posted on the SNS server may include information linked to an SNS page of the first device user which is stored in the SNS server, or to a base page of an SNS. The information linked to the SNS page or the base page of the SNS may include another person's posted writing or another person's posted comment.

The external device may transmit the extracted participant information to the first device 100, the first device 100 may display the participant information, and the first device user may select at least one from the displayed participants list, and may set a corresponding participant as the other party in which the multimedia information is to be searched for.

Figure 11:
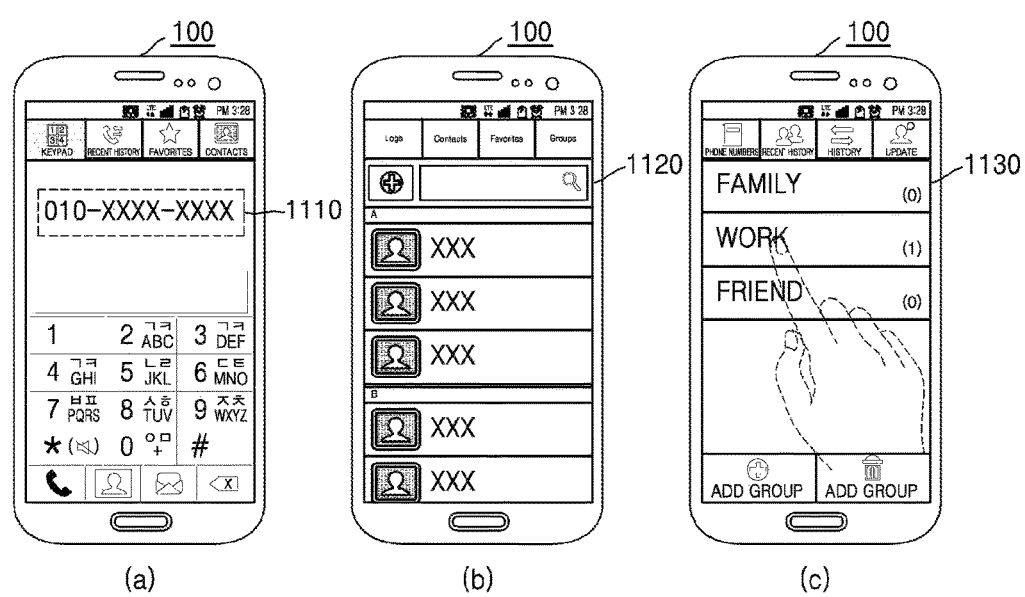

FIG. 11 is a diagram illustrating a method of setting another party in which missed event-related multimedia information is to be searched for, according to an exemplary embodiment of the inventive concept.

Referring to part (a) of FIG. 11, a first device user may directly input device identification information 1110 of the other party in which the missed event-related multimedia information is to be searched for.

Here, the device identification information 1110 of the other party may include a name or a nickname of the other party, a telephone number of the other device, or the like.

Referring to part (b) of FIG. 11, the first device user may set, by using a contact information application, the other party in which the missed event-related multimedia information is to be searched for.

As illustrated in part (b) of FIG. 11, a contact-information screen may include a list 1120 of users of which contact information is stored in the first device 100. The first device user may set the other party in which the missed event-related multimedia information is to be searched for, by inputting selection of at least one from the list.

Referring to part (c) of FIG. 11, the first device user may set a group as the other party in which the missed event-related multimedia information is to be searched for.

As illustrated in part (c) of FIG. 11, when the first device user selects a group from a screen of the contact information application, the first device may display a groups list 1130. Here, groups correspond to external device users who are classified according to preset standards such as a family, a school, a work, a friend, etc.

When the first device user selects at least one group from the groups list, the first device 100 may set a plurality of users, who are included in the selected group, as the other party in which the missed event-related multimedia information is to be searched for.

Alternatively, only some users among the plurality of users included in the selected group may be selected, and may be set as the other party in which the missed event-related multimedia information is to be searched for.

In addition, the first device 100 may receive, by using a message application, selection of the other party in which the missed event-related multimedia information is to be searched for.

When the message application is executed, the first device 100 may display, on an execution screen, message lists transmitted to or received from an external device. Also, the message lists may display identification information of the external device and some contents of a message transmitted to or received from the external device, and the first device user may select at least one from the message lists.

When at least one from the message lists is selected, the first device 100 may set the external device, which corresponds to the selected message list, as the other party in which the missed event-related multimedia information is to be searched for.

With reference to FIGS. 10 and 11, a method of setting the other party in which the missed event-related multimedia information is to be searched for is shown and described, but the inventive concept is not limited thereto and may set, by using various methods, the other party in which the missed event-related multimedia information is to be searched for.

Figure 12:
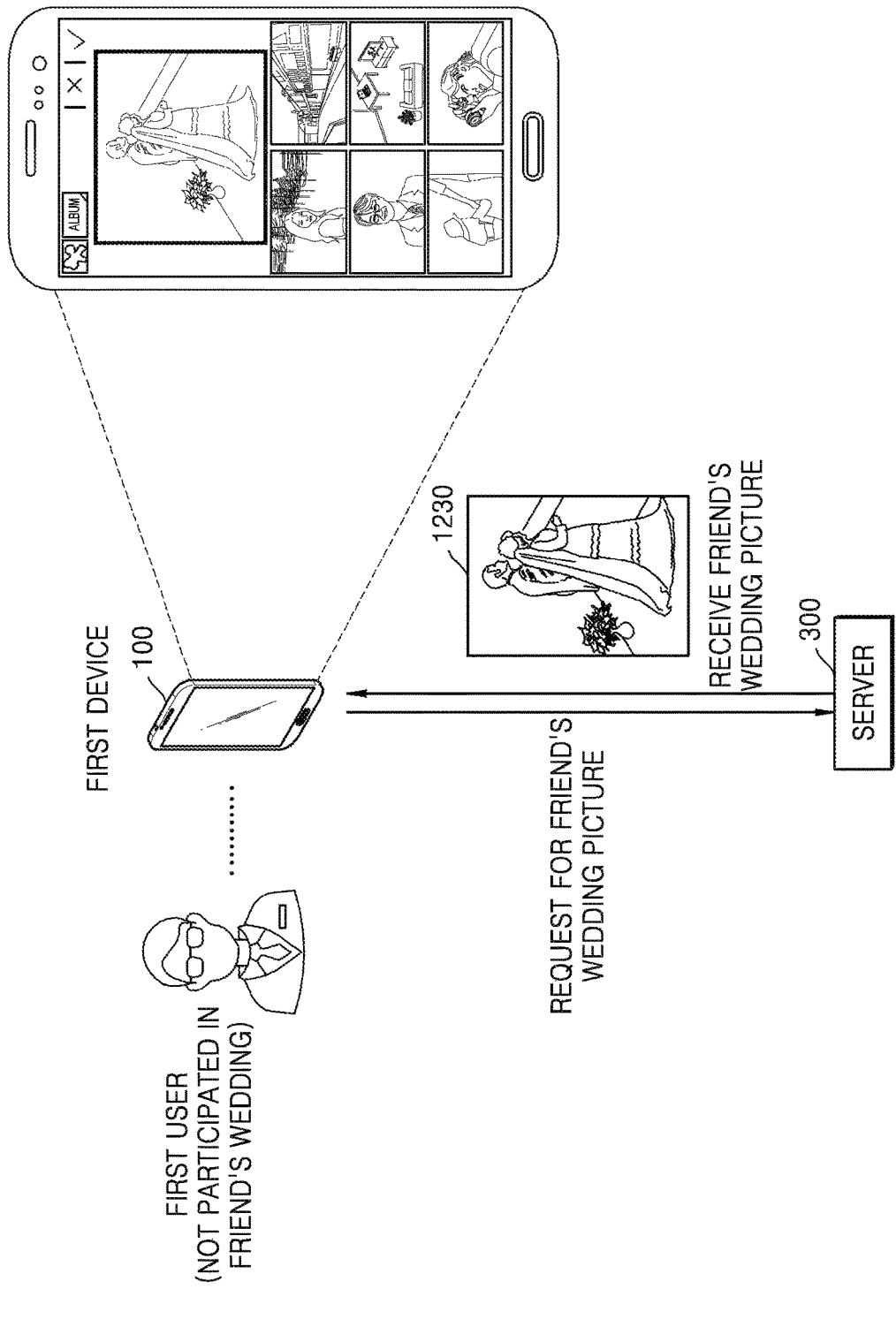
FIGS. 12 through 14 are diagrams illustrating a method of storing missed event-related multimedia information received from a server, the method being performed by a first device, according to exemplary embodiments of the inventive concept.
Figure 13:
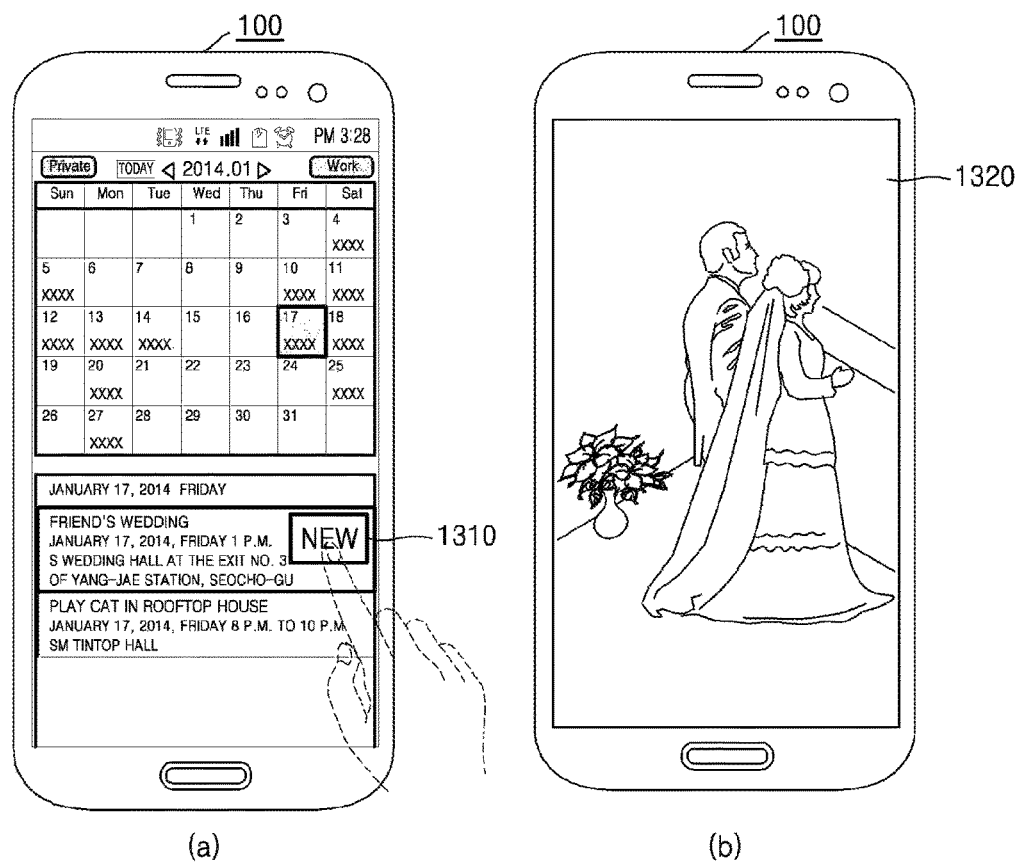
Figure 14:
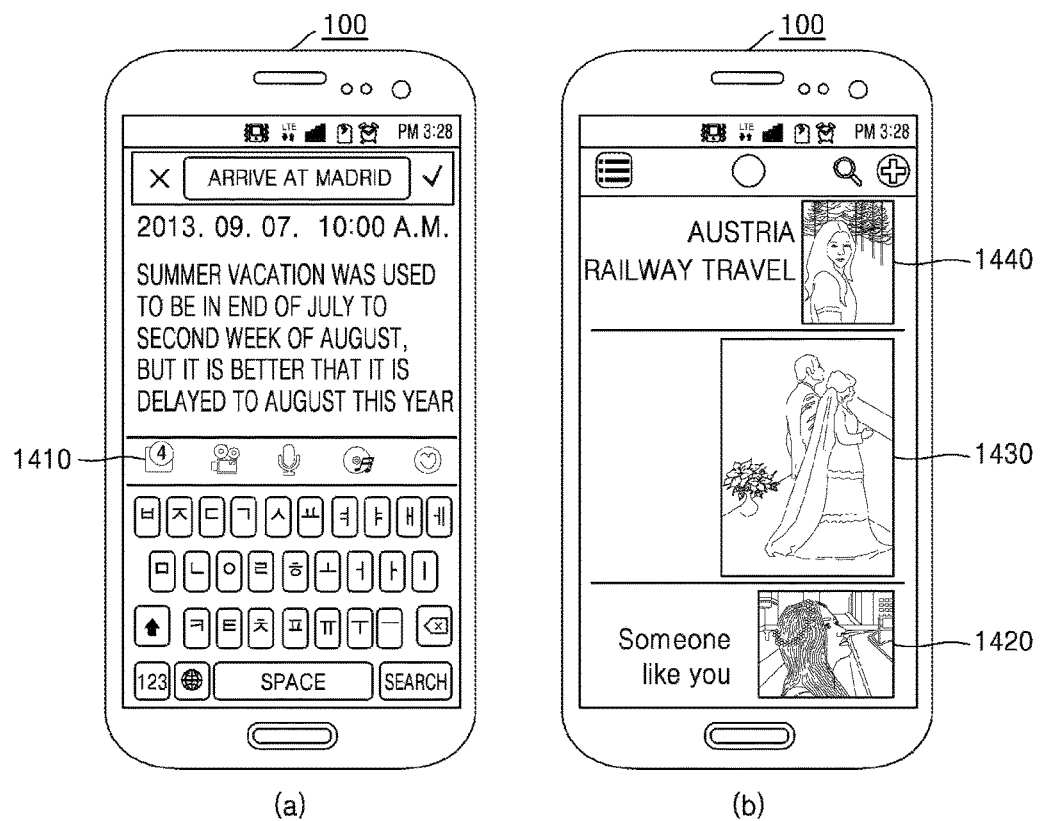

FIGS. 12 through 14 are diagrams illustrating a method of storing missed event-related multimedia information received from a server, the method being performed by a first device, according to exemplary embodiments of the inventive concept.

Referring to FIG. 12, when the first device 100 receives the missed event-related multimedia information from the server 300, the first device 100 may display it on a display part of the first device 100. Also, the received multimedia information may be automatically stored in the first device 100, or may be stored in response to a storage request by a first device user.

The first device 100 may store the missed event-related multimedia information by varying a storage location of multimedia information, according to a type of the received missed event-related multimedia information. For example, as illustrated in FIG. 12, when multimedia information received from the server 300 to the first device 100 is an image 1230 (e.g., a friend's wedding picture), the first device 100 may store the received friend's wedding picture in a gallery application of the first device 100.

Referring to FIG. 13, the first device 100 may connect the missed event-related multimedia information with a corresponding missed event, and may store the missed event-related multimedia information.

As illustrated in FIG. 13, when the first device 100 receives new multimedia information related to a missed event or an event of interest related to a schedule and automatically stores the new multimedia information, the first device 100 may display that the new multimedia information has been stored in a schedules list corresponding to the missed event.

For example, as illustrated in part (a) of FIG. 13, when the first device 100 receives, from the server 300, multimedia information related to a friend's wedding (a missed event) in which a first user did not participate, the first device 100 may display an icon 1310 showing 'New' on a list displaying a schedule of the friend's wedding, and thus may inform the first device user that new multimedia information related to the friend's wedding has been received.

Here, when the first device user selects the icon 1310 showing 'New', the first device 100 may display the multimedia information related to the friend's wedding.

For example, as illustrated in part (b) of FIG. 13, when the first device user selects a 'New' icon, the first device 100 may execute the gallery application and may display a friend's wedding picture 1320 (the missed event-related multimedia information).

Referring to FIG. 14, the first device 100 may store the missed event-related multimedia information as life-log information of the first device user.

As illustrated in FIG. 14, the first device 100 may store received multimedia information by using a diary application.

For example, the first device 100 may connect the received multimedia information with a diary of a date corresponding to a missed event, and may store the received multimedia information. As illustrated in part (a) of FIG. 14, when the date corresponding to the missed event (e.g., a friend's wedding) is Sep. 7, 2013, the first device 100 may display, on a screen of a diary at Sep. 7, 2013, one or more icons indicating that received multimedia information (e.g., a friend's wedding picture) related to the missed event is stored.

Here, when an image icon 1410 is selected among the one or more icons, the first device 100 may display the friend's wedding picture received from the server 300.

Alternatively, the first device 100 may store the received multimedia information in a timeline form.

For example, as illustrated in FIG. 14, the first device 100 may store the life-log information of the first device user in a timeline form and may display the life-log information. The first device 100 may display one or more pieces of multimedia information included in the life-log information of the first device user, in an order according to times when the one or more pieces of multimedia information are generated or are registered to a timeline, but the inventive concept is not limited thereto, and the first device 100 may display the one or more pieces of multimedia information in an order according to a user's setting.

Here, the first device 100 may register the missed event-related multimedia information (e.g., the friend's wedding), which is received from the server 300, to the timeline, based on time information of the missed event (e.g., a time of the friend's wedding), and may display the missed event-related multimedia information.

For example, as illustrated in part (b) of FIG. 14, when the time of the friend's wedding is between a registered time of first multimedia information 1420 and a registered time of second multimedia information 1440, a friend's wedding picture 1430 may be displayed between the first multimedia information 1420 and the second multimedia information 1440.

Figure 15:
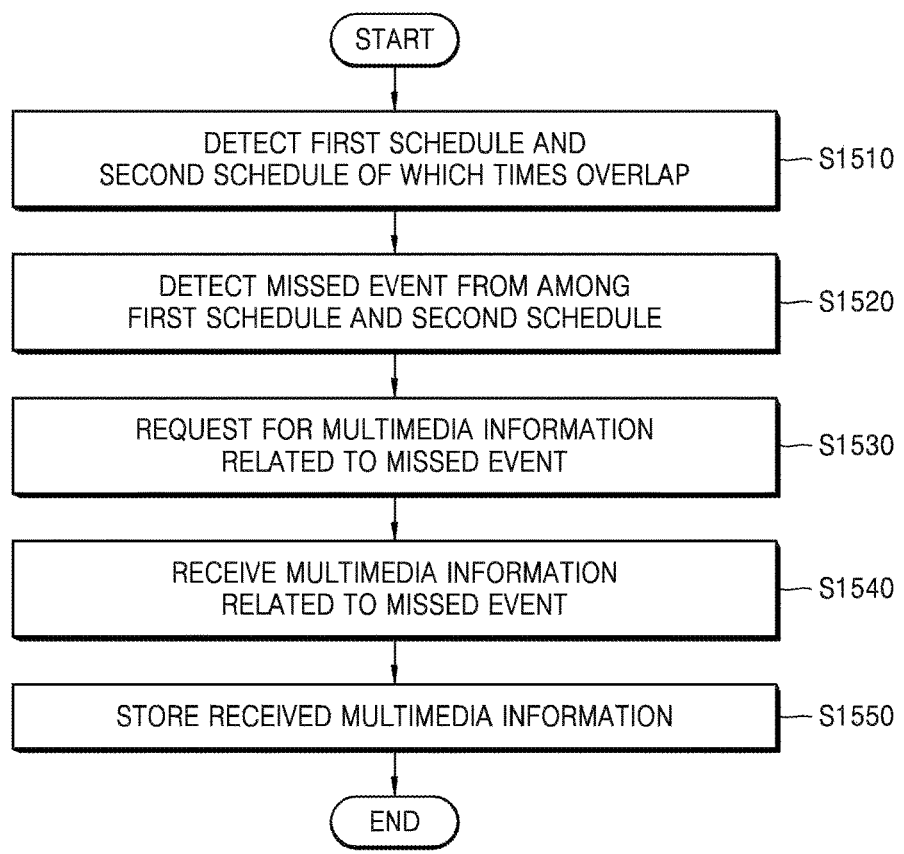
FIG. 15 is a flowchart illustrating a method of collecting multimedia information, the method being performed by a first device, according to an exemplary embodiment of the inventive concept.
Figure 16:
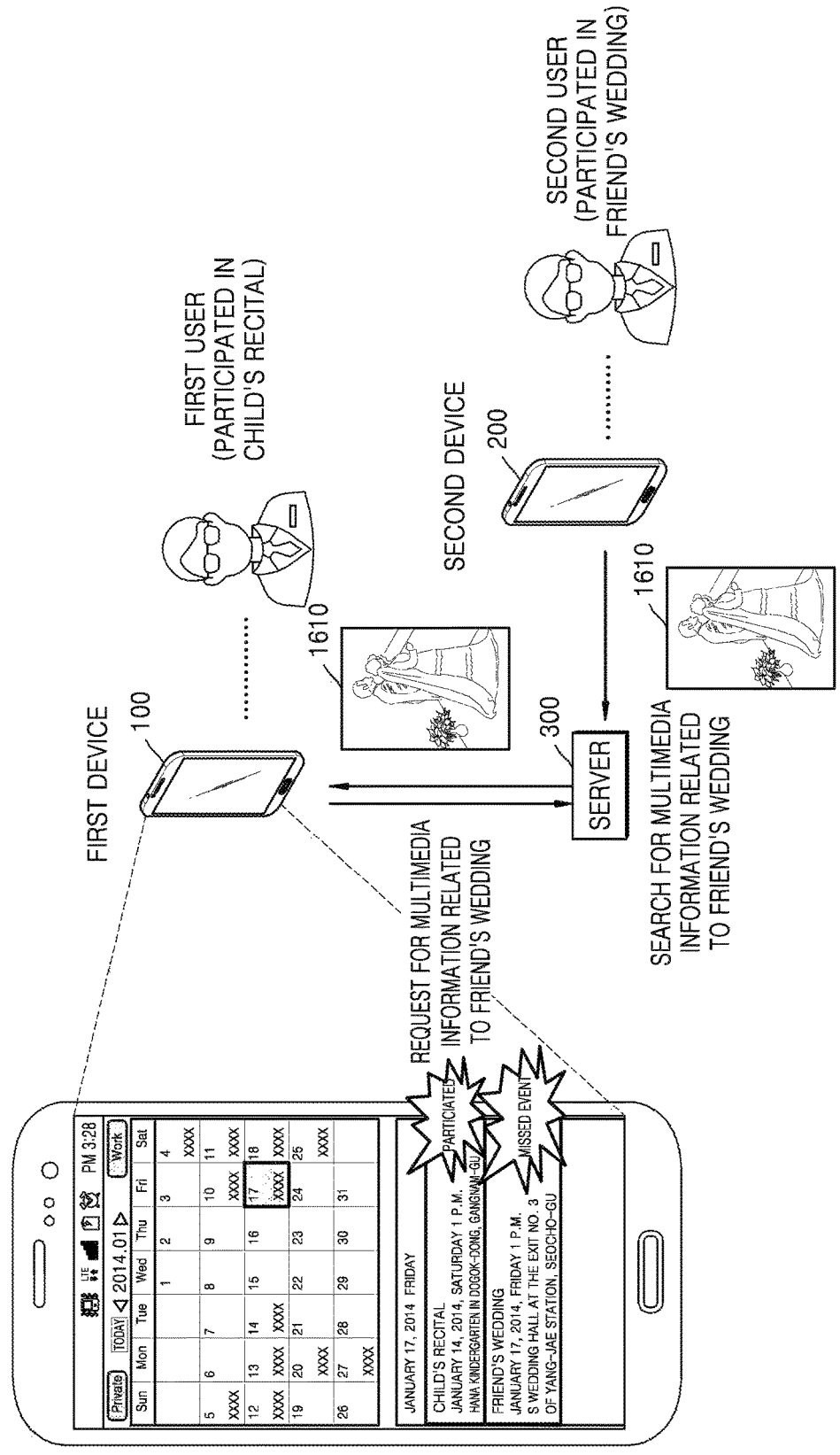
FIG. 16 is a diagram related to FIG. 15.

FIG. 15 is a flowchart illustrating a method of collecting multimedia information, the method being performed by a first device, according to an exemplary embodiment of the inventive concept, and FIG. 16 is a diagram related to FIG. 15.

Referring to FIG. 15, the first device 100 according to the present exemplary embodiment of the inventive concept may detect a first schedule and a second schedule of which times overlap in schedules registered in the first device 100 or schedules received from an external device (S1510).

The first device 100 may detect overlapping schedules of which times overlap in schedules registered in a PIMS application or a life-log application installed in the first device 100, or in the schedules received from the external device including an SNS server, a cloud server of a first device user, etc. Here, the external device may be the server 300.

The first device 100 may extract a plurality of pieces of time information of the schedules registered in the first device 100 or the schedules received from the external device, and may determine whether the registered schedules are overlap schedules, based on the plurality of pieces of extracted time information.

For example, as illustrated in FIG. 16, when a first schedule registered in the first device 100 is a child's recital, the first device 100 may extract time information (e.g., Jan. 14, 2011, Saturday, 1 p.m. to 3 p.m.) related to the child's recital.

Also, when a second schedule registered in the first device 100 is a friend's wedding, the first device 100 may extract time information (e.g., Jan. 14, 2011, Saturday, 1 p.m. to 3 p.m.) related to the friend's wedding.

The first device 100 may determine whether the extracted time information of the first schedule and the extracted time information of the second schedule overlap with each other, and thus may detect overlapping schedules.

For example, when a schedule of the child's recital and a schedule of the friend's wedding are included in Jan. 14, 2014, Saturday, 1 p.m. to 3 p.m., the first device 100 may detect the schedule of the child's recital and the schedule of the friend's wedding as overlapping schedules.

Here, not only when the extracted time information of the first schedule and the extracted time information of the second schedule are same as 1 p.m. to 3 p.m., as shown in FIG. 16, but also when the extracted time information of the first schedule and the extracted time information of the second schedule partly overlap with each other, the first device 100 may detect them as the overlapping schedules.

The first device 100 may detect a missed event from among the first schedule and the second schedule (S1520).

For example, the missed event may be automatically detected, based on information (e.g., time information, location information, etc. about the first schedule and the second schedule) about the first schedule and the second schedule that are detected as the overlapping schedules, device status information (e.g., location information of the first device 100 according to time, etc.) sensed by the first device 100, multimedia information (e.g., multimedia information related to life-log information of the first device user) stored in the first device 100, or the like. The method of detecting the missed event is described in detail with reference to FIGS. 5 through 7, and thus, detailed descriptions thereof are omitted.

The first device 100 may request the server 300 for multimedia information related to the missed event (S1530). For example, when the missed event is detected, the first device 100 may automatically request the server 300 for the multimedia information related to the missed event.

Here, the first device 100 may request the server 300 for the multimedia information related to the missed event, after a schedule detected as the missed event is ended or after the schedule is ended and then a preset time period elapses. However, the inventive concept is not limited thereto.

Alternatively, the first device 100 may request the multimedia information related to the missed event, based on a user input.

Also, the first device 100 may transmit, to the server 300, the request for the multimedia information and information about the missed event. The information about the missed event may include time information, location information, an event title, participant information, etc., of the missed event.

For example, as illustrated in FIG. 16, when the first device 100 detects the child's recital as a participated event, and detects the friend's wedding as the missed event, the first device 100 may transmit, to the server 300, time information of the friend's wedding (e.g., Jan. 14, 2011, Saturday, 1 p.m. to 3 p.m.), location information (e.g., S Wedding Hall at exit no. 3 of Yang-jae station, Seocho-gu), a name of the friend getting married, information about participants in the friend's wedding, etc.

An operation 1530 (S1530) of FIG. 15 corresponds to an operation 220 of FIG. 2.

The server 300 may search for missed event-related multimedia information, and may transmit found missed event-related multimedia information to the first device 100.

The server 300 may search for the missed event-related multimedia information, based on information (e.g., time information, location information, an event title, participant information, etc. of the missed event) about the missed event which is received from the first device 100.

For example, as illustrated in FIG. 16, the server 300 may search for a friend's wedding picture 1610 transmitted from a second device user (a participant of the friend's wedding) to the server 300, by using, as search words, the time information of the friend's wedding, the location information, the name of the marrying friend, the information about the participants in the friend's wedding, etc., and may transmit the found friend's wedding picture 1610 to the first device 100.

The first device 100 may receive the found multimedia information related to the missed event, from the server 300 (S1540), and may store the received multimedia information as the life-log information of the first device user (S1550).

An operation 1540 (S1540) of FIG. 15 corresponds to an operation 230 (S230) of FIG. 2, an operation 1550 (S1550) of FIG. 15 corresponds to an operation 240 (S240) of FIG. 2, and thus, detailed descriptions thereof are omitted.

Figure 17:
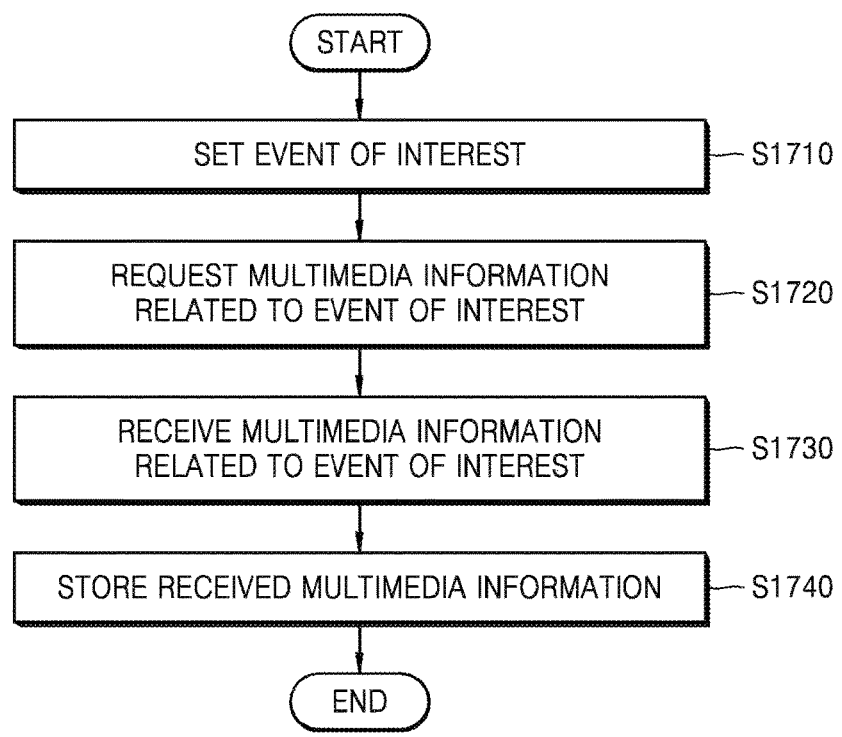
FIGS. 17 and 18 are flowcharts illustrating a method of collecting multimedia information, the method being performed by a first device, according to exemplary embodiments of the inventive concept.
Figure 18:
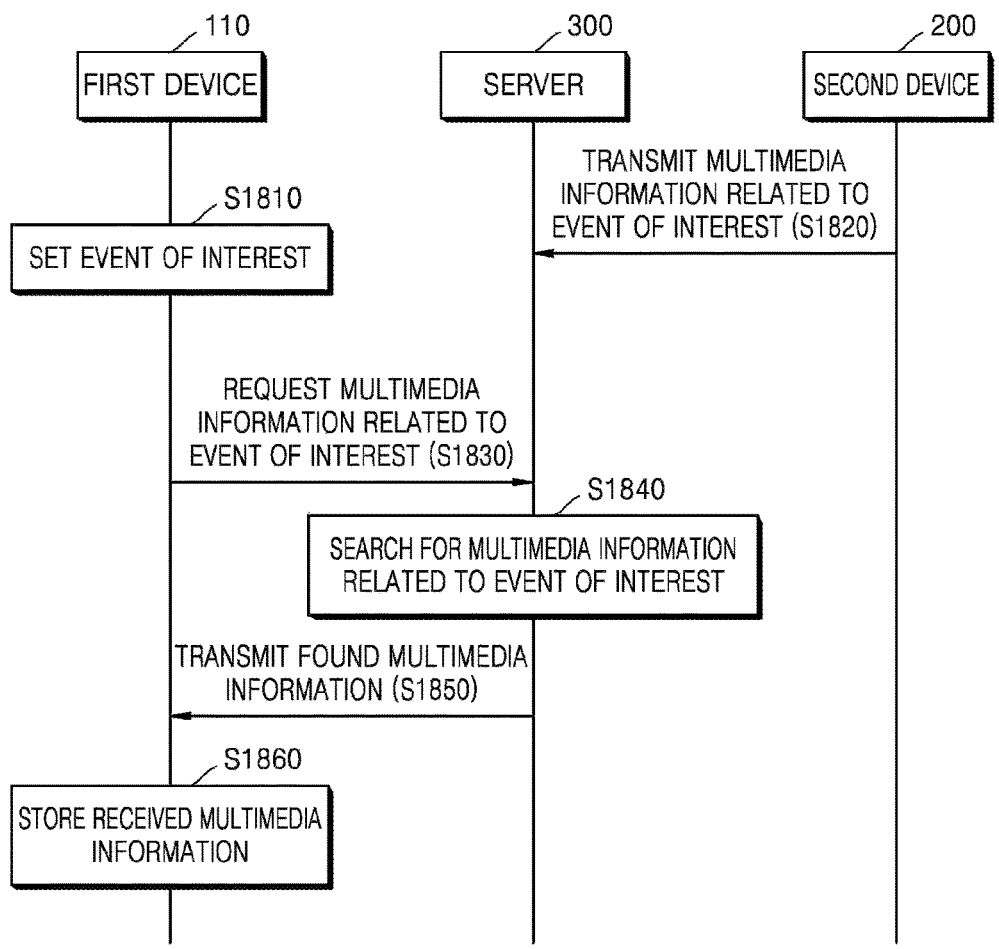
Figure 19:
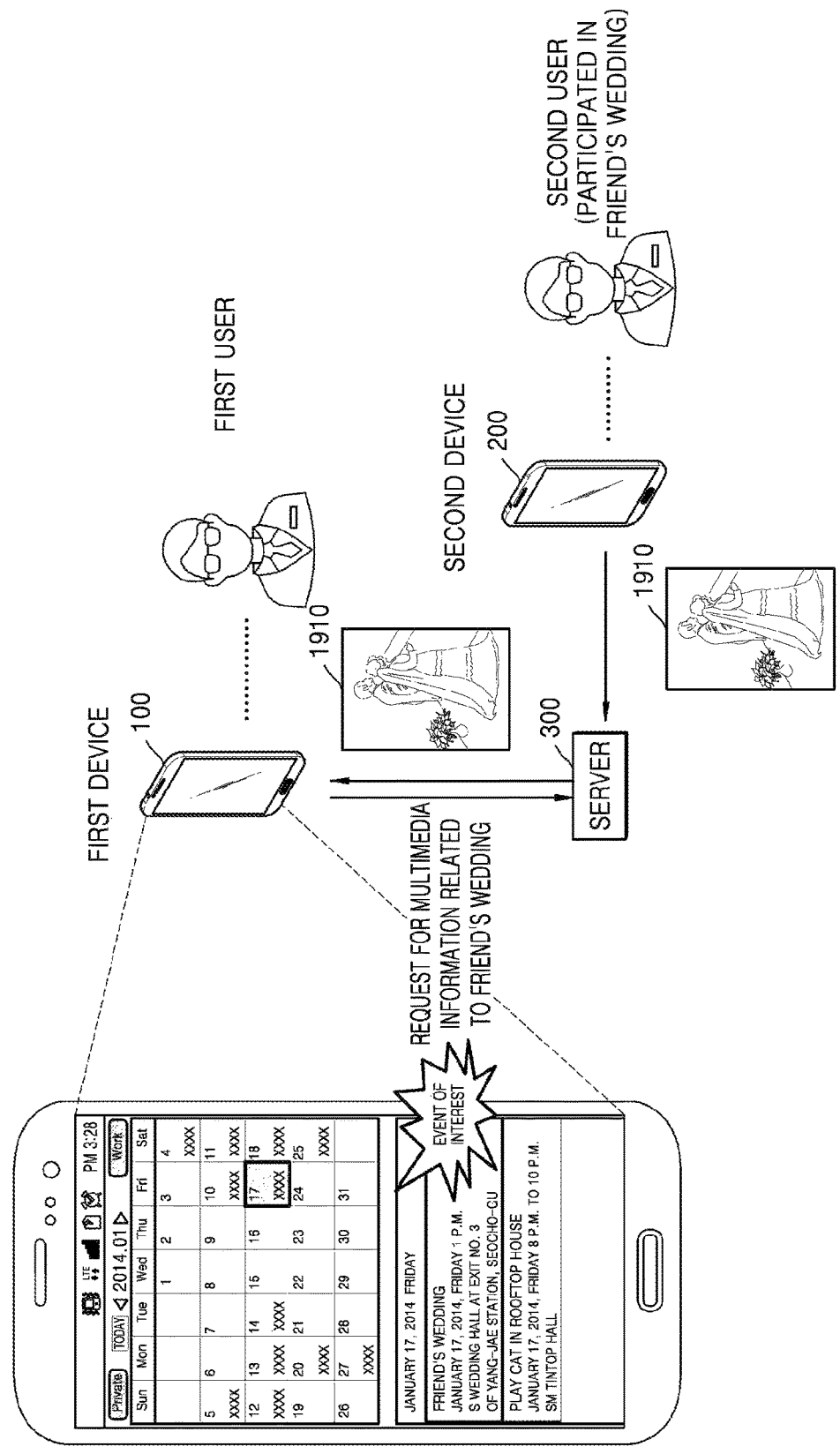
FIG. 19 is a diagram related to FIGS. 17 and 18.

FIGS. 17 and 18 are flowcharts illustrating a method of collecting multimedia information, the method being performed by a first device, according to exemplary embodiments of the inventive concept, and FIG. 19 is a diagram related to FIGS. 17 and 18.

Referring to FIGS. 17 and 18, the first device 100 according to the present exemplary embodiment of the inventive concept may set an event of interest (S1710 and S1810).

Here, the event of interest may include all schedules registered in the first device 100 or all schedules received from an external device, or may include some schedules selected by a first device user from the registered or received schedules, and may also include a schedule (a missed event) in which the first device user did not participate or a schedule in which the first device user participated.

Alternatively, a schedule that is periodically repeated from among the schedules registered to or received by the first device 100 may be set as the event of interest.

For example, when the first device user attempts to collect multimedia information about a schedule in which the first device user participated and is from among the schedules registered to the first device 100 or received from the external device, the first device user may set the schedule as the event of interest.

Referring to FIG. 19, when the first device user attempts to collect multimedia information about a friend's wedding in which the first device user participated, the first device user may set the friend's wedding as the event of interest.

Alternatively, the event of interest may be irrelevant to a schedule and may include persons, contents, sports games, events, etc. that the first device user is interested in.

When the event of interest is set, the first device 100 may request the server 300 for multimedia information related to the event of interest (S1720 and S1830).

Also, the first device 100 may transmit, to the server 300, the request for the multimedia information and information about the event of interest. For example, if the event of interest is related to the schedule, the information about the event of interest may include time information, location information, an event title, participant information, etc., of the schedule that is set as the event of interest.

For example, as illustrated in FIG. 19, when the first device user sets a friend's wedding as the event of interest, the information about the event of interest may include location information of the friend's wedding (e.g., S Wedding Hall at exit no. 3 of Yang-jae station, Seocho-gu), time information of the friend's wedding (wedding start time information and end time information, e.g., Jan. 14, 2011, Saturday, 1 p.m. to 3 p.m.), a name of the friend getting married, information about participants in the friend's wedding, etc.

Also, when the interest event is a schedule in which the first device user participated, the first device 100 may transmit, to the server 300, stored multimedia information related to the event of interest.

On the other hand, when the event of interest is irrelevant to the schedules registered in the first device 100, the information about the event of interest may include an object's name (or a person's name) related to the event of interest, a title of the event of interest, a type of the event of interest, time information of the event of interest, location information of the event of interest, etc.

Here, the first device 100 may automatically detect the information about the event of interest or may obtain the information about the event of interest due to a user input. Also, when a plurality of pieces of information about the event of interest are detected, the first device 100 may display the plurality of pieces of extracted information about the event of interest, and may transmit, to the server 300, information that is selected by a user from among the plurality of pieces of displayed information. However, the inventive concept is not limited thereto, and all of the plurality of pieces of extracted information about the event of interest may be transmitted to the server 300.

Referring to FIG. 18, the server 300 may search for multimedia information related to the event of interest and requested by the first device 100 (S1840).

The server 300 may search for interest event-related multimedia information, based on a plurality of pieces of multimedia information received from external devices including the second device 200 in an operation 1820 (S1820) of FIG. 18, and here, the second device 200 may be a device that transmits the interest event-related multimedia information.

For example, a second device user, as illustrated in FIG. 19, may be a participant of a friend's wedding that is set as the event of interest, and the multimedia information transmitted from the second device 200 to the server 300 may include multimedia information (e.g., a friend's wedding picture, etc.) related to the friend's wedding.

The server 300, as illustrated in FIG. 19, may search for a friend's wedding picture 1910 transmitted from the second device user (the participant of the friend's wedding) to the server 300, by using, as search words, time information of the friend's wedding, location information, a name of the friend getting married, information about participants in the friend's wedding, etc., and may transmit the found friend's wedding picture 1910 to the first device 100.

The server 300 may determine whether the found interest event-related multimedia information is same as interest event-related multimedia information received from the first device 100, and may not transmit same multimedia information to the first device 100. Accordingly, it is possible to prevent that the interest event-related multimedia information already stored in the first device 100 is repeatedly transmitted.

The first device 100 may receive the multimedia information related to the event of interest and found by the server 300 (S1730 and S1850), and may store the received multimedia information as life-log information of the first device user (S1740 and S1860).

Therefore, the first device user may store, as the life-log information of the first device user, multimedia information that is not stored in the first device 100 and is from among a plurality of pieces of multimedia information related to not only the schedule in which the first device user did not participate but also the schedule in which the first device user participated.

An operation 1730 (S1730) of FIG. 17 and an operation 1850 of FIG. 18 correspond to an operation 230 (S230) of FIG. 2, an operation 1740 (S1740) of FIG. 17 and an operation 1860 (S1860) of FIG. 18 correspond to an operation 240 (S240) of FIG. 2, and thus, detailed descriptions thereof are omitted.

Figure 20:
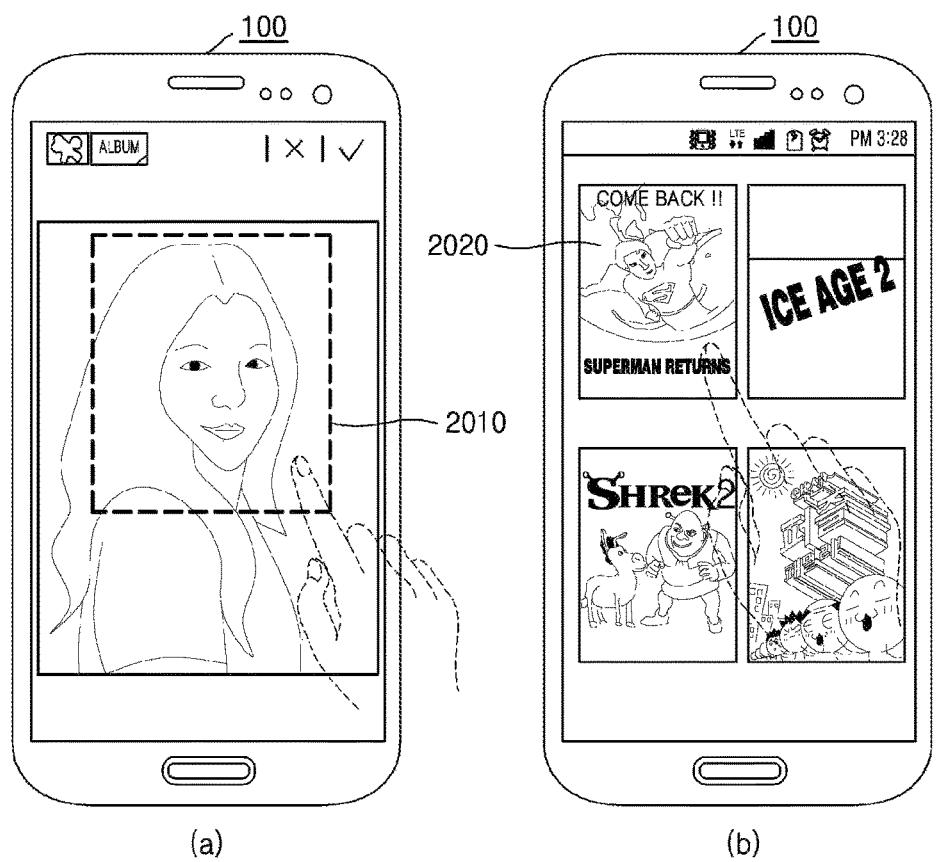
FIG. 20 is a diagram illustrating a method of setting an event of interest irrelevant to a schedule, according to an exemplary embodiment of the inventive concept.

FIG. 20 is a diagram illustrating a method of setting an event of interest irrelevant to a schedule, according to an exemplary embodiment of the inventive concept.

Referring to FIG. 20, the first device 100 may set a person as an event of interest, and may request the server 300 for multimedia information related to the person.

The first device 100 may set, as an event of interest, the person that a first device user is interested in, based on life-log information of the first device user. For example, the first device 100 may analyze a person related to multimedia information stored as a life-log by the first device user, and may detect the person that the first device user is interested in.

Alternatively, the first device 100 may set the person as the event of interest, based on an input by the first device user. For example, as illustrated in part (a) of FIG. 20, the first device user may select an image 2010 of the person, and thus may set the person as the interest event, or the first device user may input a name of the person, and thus may set the person as the interest event. However, the inventive concept is not limited thereto.

When the server 300 receives a request for the multimedia information related to the person from the first device 100, the server 300 may search for posted multimedia information or a posted comment related to the person, and may transmit the posted multimedia information or the posted comment to the first device 100.

Referring to FIG. 20, the first device 100 may set a movie as an interest event, and may request the server 300 for multimedia information related to the movie.

The first device 100 may set, as the event of interest, a movie that the first device user is interested in, based on the life-log information of the first device user. For example, when the first device user posts movie information, or the like, the first device 100 may set a corresponding movie as the event of interest.

Alternatively, the first device 100 may set a movie as the event of interest, based on an input by the first device user. For example, as illustrated in part (b) of FIG. 20, the first device user may select a movie 2020 and thus may set the movie as the event of interest, or the first device user may input a title of a movie and thus may set the movie as the event of interest. However, the inventive concept is not limited thereto.

When the server 300 receives a request for multimedia information related to the movie from the first device 100, the server 300 may search for posted multimedia information or a posted comment related to the movie, and may transmit the posted multimedia information or the posted comment to the first device 100.

For example, the server 300 may transmit, to the first device 100, movie listing information (movie release date, movie showing period, theatres showing movie, etc.) of the movie, movie characters, movie ratings, or the like.

Figure 21:
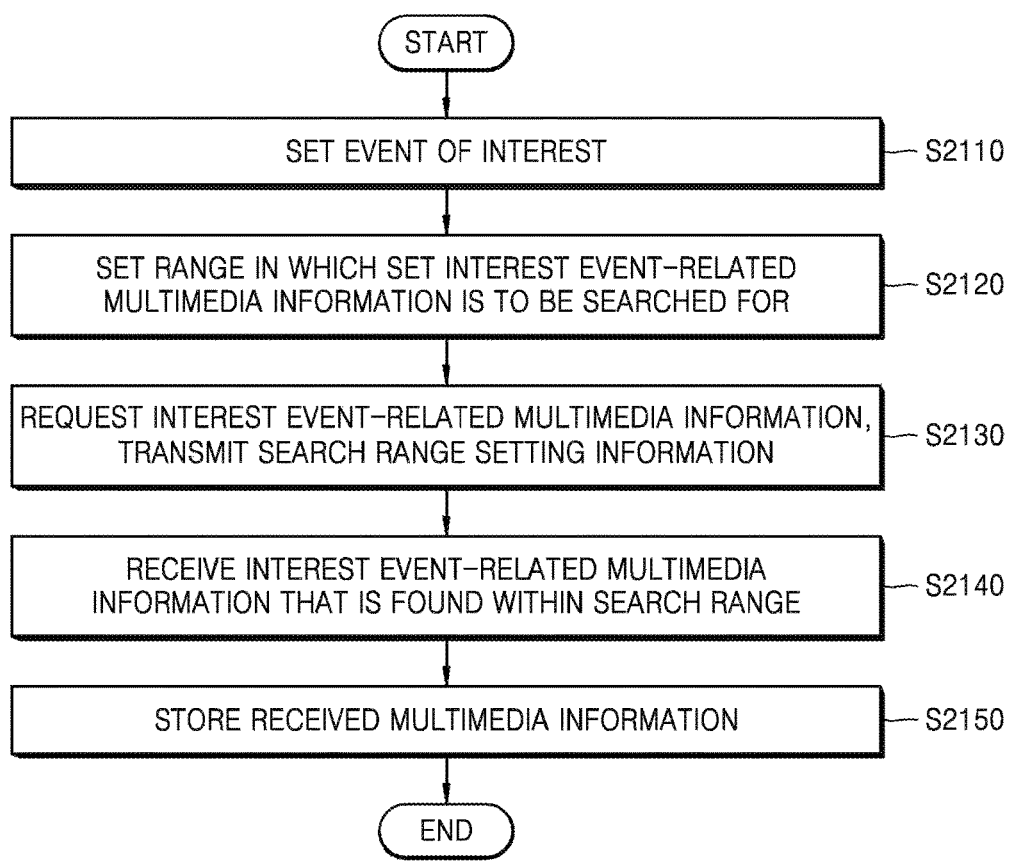
FIGS. 21 and 22 are flowcharts illustrating a method of setting a collection range of multimedia information, and collecting the multimedia information within the set range, according to exemplary embodiments of the inventive concept.
Figure 22:
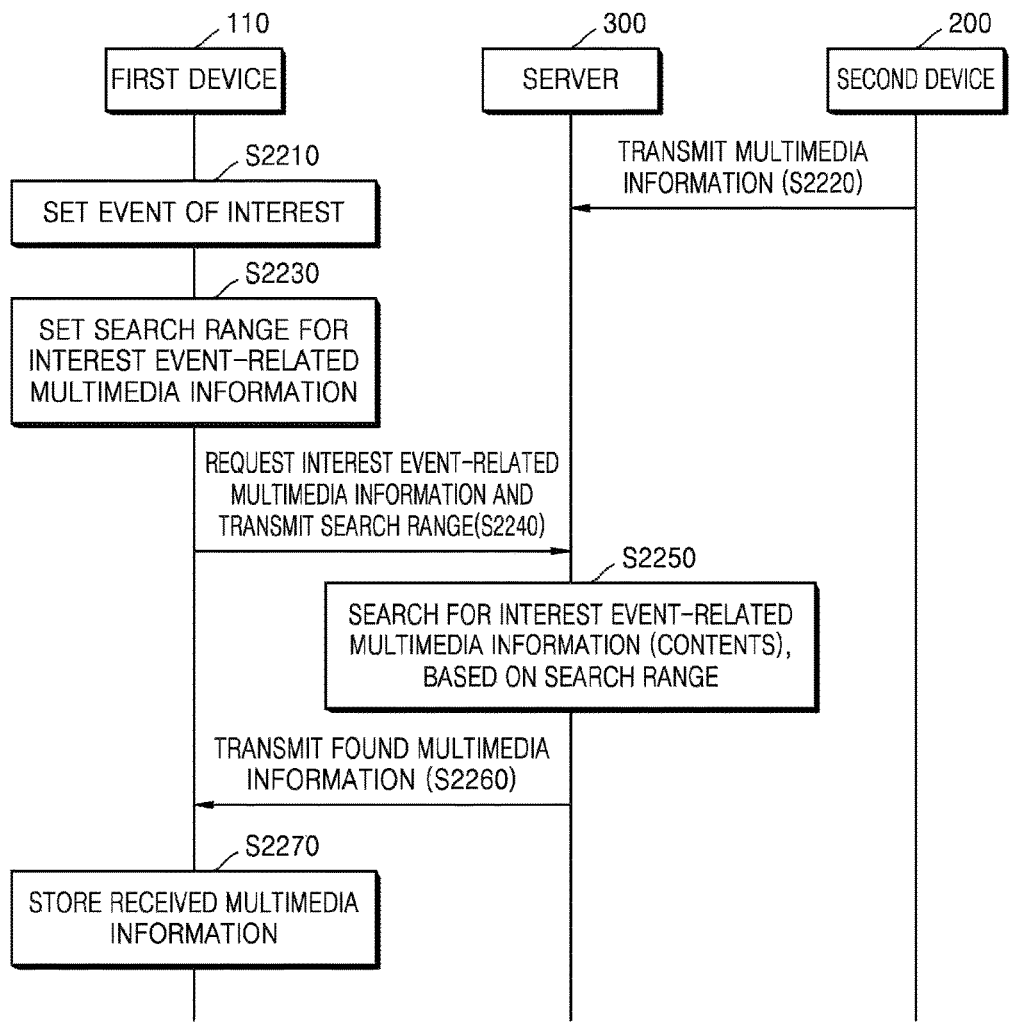

FIGS. 21 and 22 are flowcharts illustrating a method of setting a collection range of multimedia information, and collecting the multimedia information within the set range, according to exemplary embodiments of the inventive concept.

Referring to FIGS. 21 and 22, the first device 100 may set an event of interest (S2110 and S2210). As illustrated in FIG. 17, the event of interest may include an event related to a schedule, and an event irrelevant to the schedule, and the event of interest related to the schedule may include a schedule in which a first user participated, and a schedule (a missed event) in which the first device user did not participate.

The first device 100 may set a range in which interest event-related multimedia information is to be searched for (S2120 and S2230).

For example, a search range of multimedia information may include a range of other parties, in which the multimedia information is to be searched for, a type of the multimedia information to be searched for, a location where the multimedia information is to be searched for, a period in which the multimedia information is to be searched for, a generation time or generation location of the multimedia information to be searched for, an uploaded time or uploaded location of the multimedia information to be searched for, information about an object included in the multimedia information to be searched for, or the like.

The first device 100 may request the server 300 for the interest event-related multimedia information, and may transmit search range setting information of the multimedia information to the server 300 (S2130 and S2240).

Referring to FIG. 22, the server 300 may search for the interest event-related multimedia information, based on the search range setting information (S2250), and may transmit, to the first device 100, interest event-related multimedia information that is found within the search range (S2140 and S2260).

A method of searching for the interest event-related multimedia information, based on the search range setting information, the method being performed by the server 300, will be described in detail with reference to FIGS. 23 through 27.

The first device 100 may store the received multimedia information (S2150 and S2270). Here, the first device 100 may store the received multimedia information as life-log information of the first device user, and may automatically store the received multimedia information or may store the received multimedia information according to a storage request by the first device user.

FIGS. 23 through 27 are diagrams illustrating a method of searching for interest event-related multimedia information, based on search range setting information, according to exemplary embodiments of the inventive concept.

Figure 23:
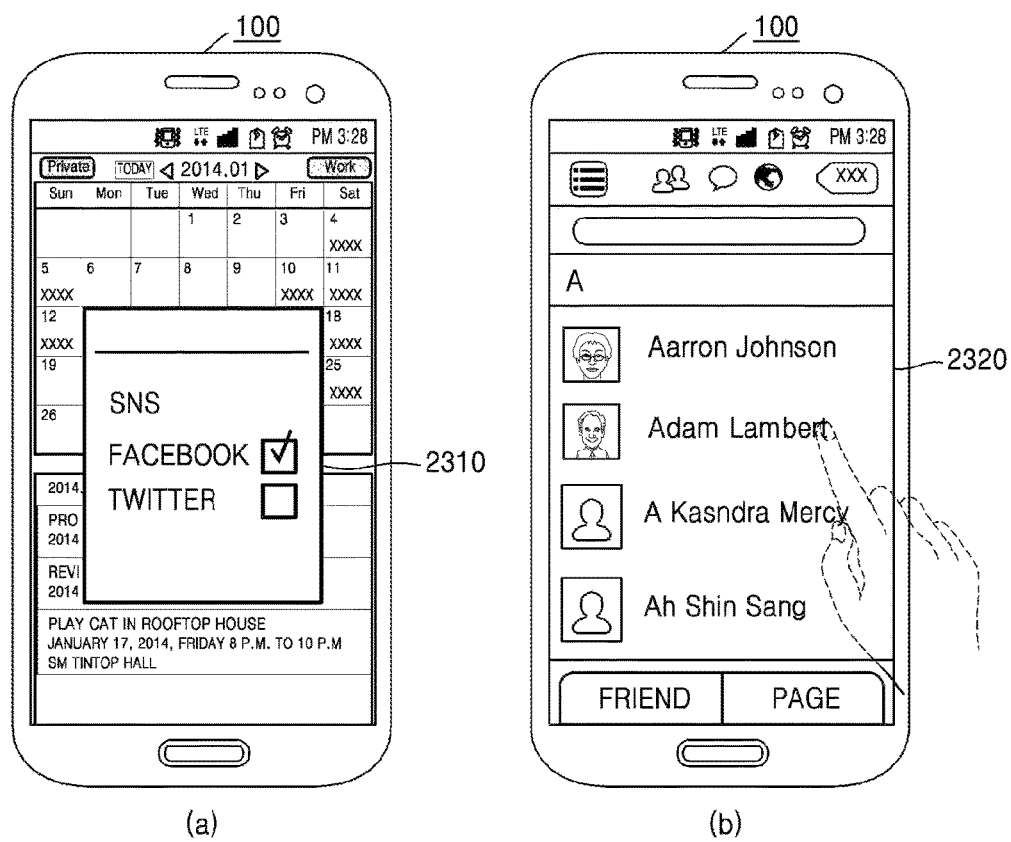
FIGS. 23 through 27 are diagrams illustrating a method of searching for interest event-related multimedia information, based on search range setting information, according to exemplary embodiments of the inventive concept.

Referring to FIG. 23, the first device 100 according to the present exemplary embodiment of the inventive concept may set a server in which the interest event-related multimedia information is to be searched for, and the other party in which multimedia information is to be searched for.

If there is a plurality of servers in which multimedia information is searchable, the first device 100 may receive selection of one of the plurality of servers, based on a user input. For example, as illustrated in part (a) of FIG. 23, if a first device user attempts to search for the interest event-related multimedia information by using an SNS server, the first device 100 may display an SNS list 2310 in which the first device user joined.

When the first device user selects, from the SNS list 2310, an SNS in which the interest event-related multimedia information is to be searched for, as illustrated in part (b) of FIG. 23, the first device 100 may display a friends list 2320 corresponding to the selected SNS. Here, the first device user may select a second device user (a second user) by using the SNS friends list 2320, and may set the selected second user as the other party in which the multimedia information is to be searched for.

Accordingly, the first device 100 may transmit, to a server 300 (e.g., an SNS server) corresponding to the selected SNS, a request for searching for the interest event-related multimedia information, information about the event of interest, and setting information of the selected other party.

The server 300 may search for the interest event-related multimedia information within multimedia information transmitted from a second device to the server 300 (S2220 of FIG. 22).

Although not illustrated, the first device 100 may set the other party (the second device user) for collecting multimedia information, by using a friends list of a contact information application or a messenger application.

Also, the first device 100 according to the present exemplary embodiment of the inventive concept may set a website (search location setting) in which the interest event-related multimedia information is to be searched for, and when the first device 100 sets a website as a location at which multimedia information is searched for, the server 300 may search for the interest event-related multimedia information within multimedia information stored in the website. Alternatively, when the first device 100 sets a URL for collecting multimedia information, the server 300 may search for the interest event-related multimedia information within multimedia information stored in a webpage corresponding to the URL. Alternatively, when the first device 100 sets a search site in which multimedia information is to be searched for, the server 300 may search for the interest event-related multimedia information by using the search site.

Figure 24:
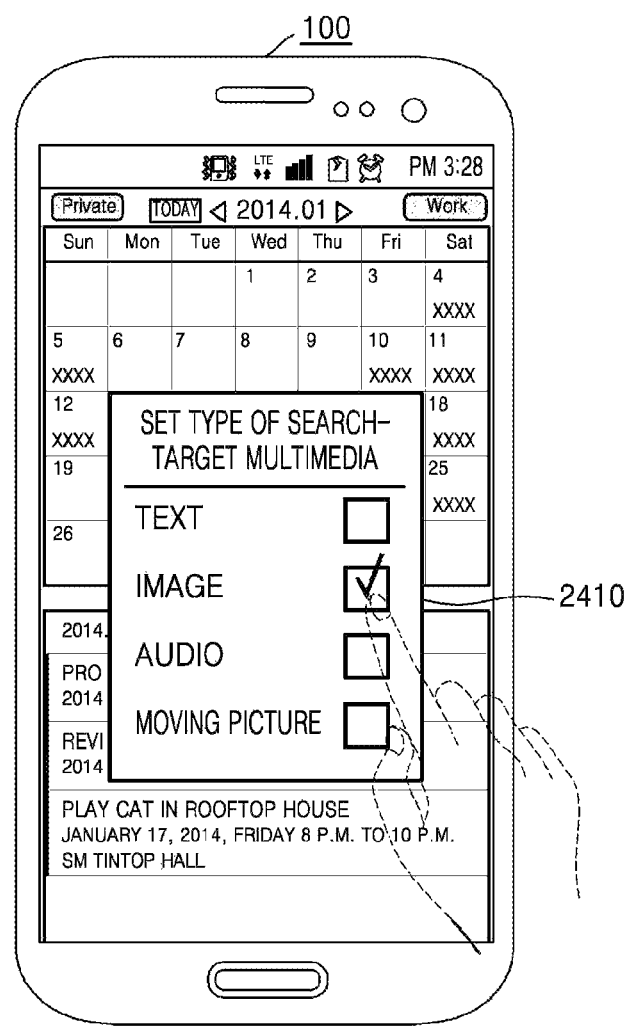

Referring to FIG. 24, the first device 100 according to the present exemplary embodiment of the inventive concept may set a type of multimedia information to be searched for.

For example, as illustrated in FIG. 24, the first device 100 may display a menu 2410 for selecting a type of multimedia information to be searched for, and when a first device user selects, from the menu 2410, an image as the type of multimedia information to be searched for, the server 300 may search for an interest event-related image within an image in multimedia information stored in the server 300.

In addition, the first device 100 may set a text, an audio, a moving picture, etc. as the type of the multimedia information, and may search for the interest event-related multimedia information within multimedia information having the set type.

Figure 25:
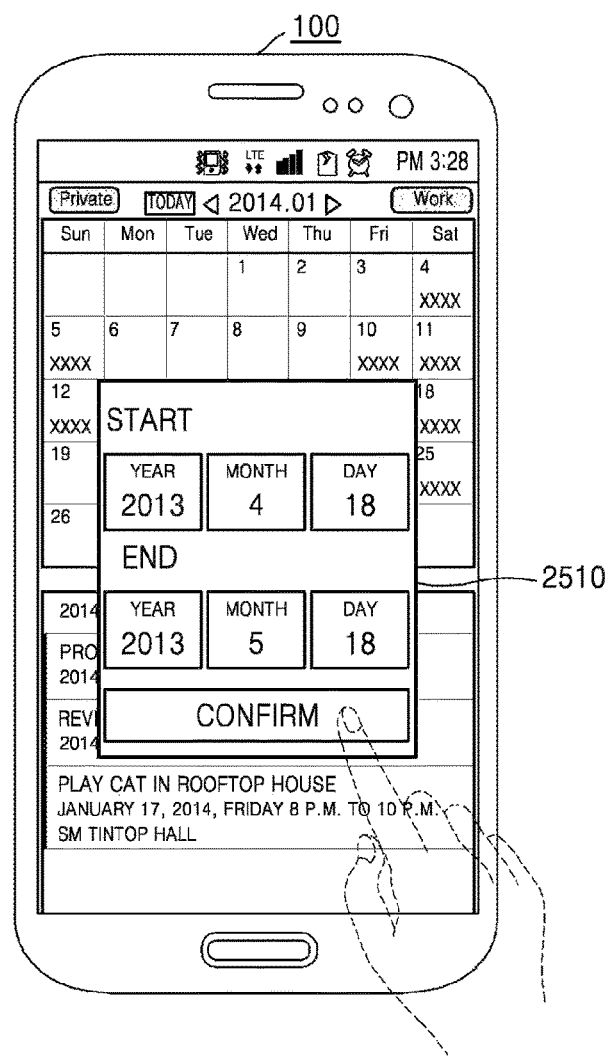

Referring to FIG. 25, the first device 100 according to the present exemplary embodiment of the inventive concept may set a period during which interest event-related multimedia information is to be searched for.

For example, as illustrated in FIG. 25, a first device user may set a search period 2510 by inputting a start time and an end time during which the interest event-related multimedia information is to be searched for. When the first device user sets a period during which multimedia information is to be searched for, the server 300 may search for the interest event-related multimedia information within the set period.

Also, for an event of interest related to a schedule, the server 300 may search for, based on time information corresponding to the event of interest, the interest event-related multimedia information within a day, a week, and a month to which an end time of the event of interest belongs.

Also, for the event of interest related to the schedule, the server 300 may analyze metadata of multimedia information stored in the server 300, and may detect a generation time of the multimedia information. The server 300 may search for the interest event-related multimedia information from among a plurality of pieces of multimedia information of which generation times belong to a period between a start time and an end time of a schedule corresponding to the event of interest. Alternatively, the server 300 may search for the interest event-related multimedia information from among a plurality of pieces of multimedia information of which generation times are in a date, a week, and a month to which the schedule corresponding to the event of interest belongs.

Alternatively, when the first device 100 sets a generation time range of multimedia information to be searched for, the server 300 may search for the interest event-related multimedia information from among a plurality of pieces of multimedia information that are stored in the server 300 and of which generation times are within the set generation time range.

Also, for the event of interest related to the schedule, the server 300 may detect an uploaded time of multimedia information stored in the server 300. The server 300 may search for the interest event-related multimedia information from among a plurality of pieces of multimedia information of which uploaded times belong to the period between the start time and the end time of the schedule corresponding to the event of interest. Alternatively, the server 300 may search for the interest event-related multimedia information from among a plurality of pieces of multimedia information of which uploaded times are in a date, a week, and a month to which the schedule corresponding to the event of interest belongs. Alternatively, when the first device 100 sets an uploaded time of multimedia information to be searched for, the server 300 may search for the interest event-related multimedia information from among a plurality of pieces of multimedia information of which uploaded times are equal to the set time.

Figure 26:
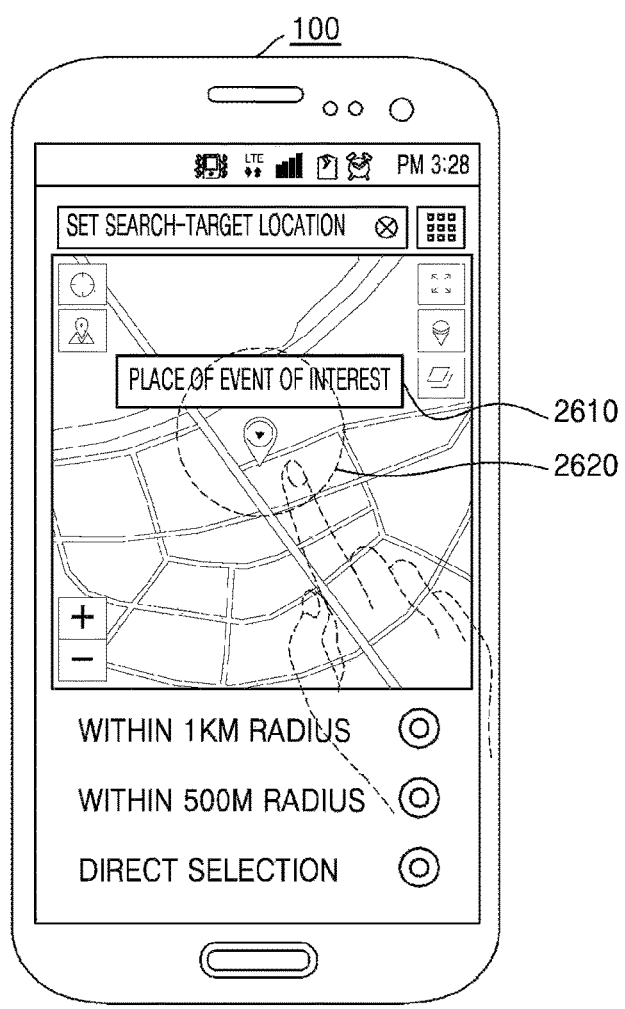

Referring to FIG. 26, the first device 100 according to the present exemplary embodiment of the inventive concept may set a generation location of multimedia information to be searched for or an uploaded location of multimedia information.

For example, as illustrated in FIG. 26, the first device user may set, by using a map application, etc., a generation location range or an uploaded location range of multimedia information to be searched for. Here, when an event of interest includes location information, a preset radius 2620 from a point 2610 corresponding to the location information of the event of interest may be set as the generation location range or the uploaded location range of the multimedia information to be searched for.

When the generation location range or the uploaded location range of the multimedia information to be searched for is set, the server 300 may analyze generation locations or uploaded locations of a plurality of pieces of multimedia information by analyzing metadata of the plurality of pieces of multimedia information stored in the server 300, and may search for interest event-related multimedia information within one or more pieces of multimedia information of which generation locations or uploaded locations belong to the set location range (e.g., within a preset radius from a point corresponding to the event of interest).

Figure 27:
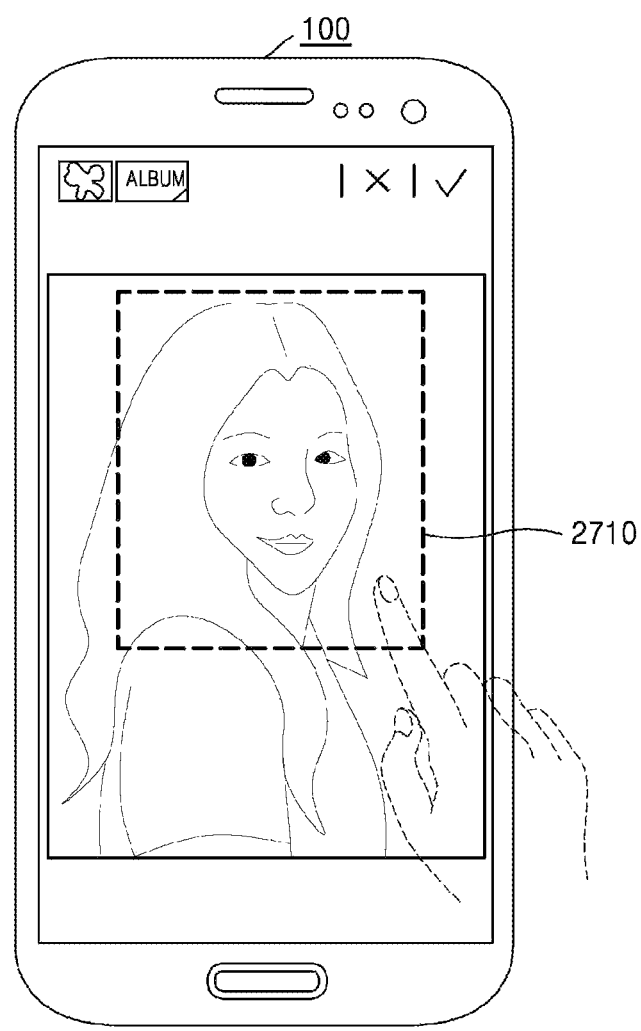

Referring to FIG. 27, the first device 100 according to the present exemplary embodiment may set object information (e.g., information about a person, a building, a character, etc.) included in multimedia information to be searched for.

For example, as illustrated in FIG. 27, a first device user may select an image 2710 of a person, and may set interest event-related multimedia information to be searched for within multimedia information that includes the selected person.

When the first device user sets a person A, the server 300 may extract, by using face recognition, multimedia information including the person A from multimedia information including an image which is stored in the server 300, and may search for the interest event-related multimedia information within the extracted multimedia information.

When a building B is set, the server 300 may extract, by using pattern recognition, multimedia information including the building B from multimedia information, and may search for the interest event-related multimedia information within the extracted multimedia information.

When a character C is set, the server 300 may perform character recognition using OCR or the like on multimedia information, may extract multimedia information including the character C, and may search for the interest event-related multimedia information within the extracted multimedia information.

FIGS. 28 through 32 are diagrams illustrating a method of storing multimedia information received from a server, the method being performed by a first device, according to exemplary embodiments of the inventive concept.

Figure 28:
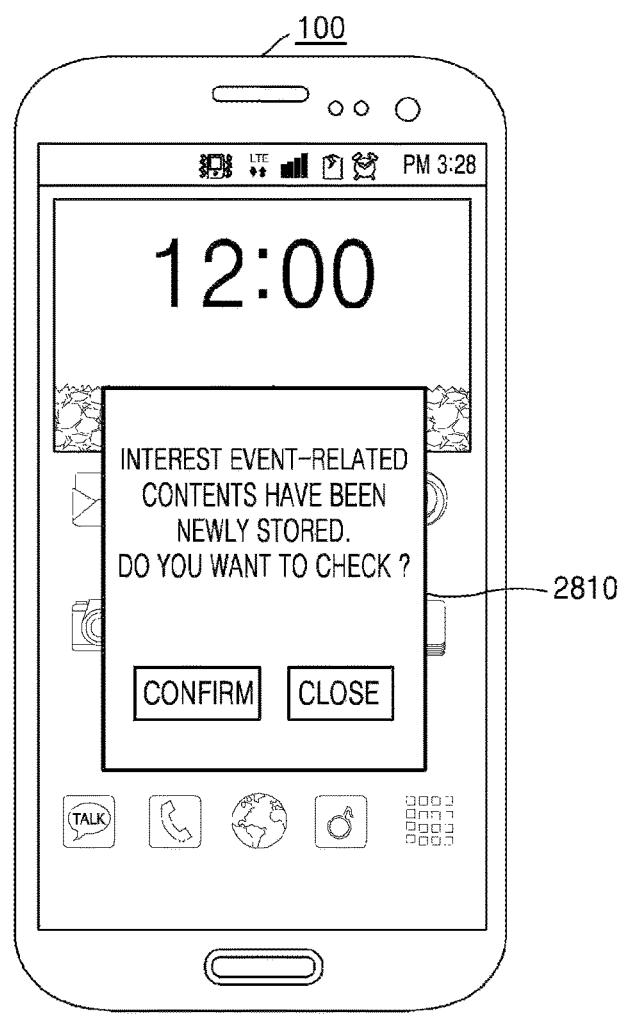
FIGS. 28 through 32 are diagrams illustrating a method of storing multimedia information received from a server, the method being performed by a first device, according to exemplary embodiments of the inventive concept.

Referring to FIG. 28, when the first device 100 receives interest event-related multimedia information from the server 300, the first device 100 may automatically store received multimedia information in the first device 100, and may display a notice message 2810 indicating that the multimedia information has been stored.

Figure 29:
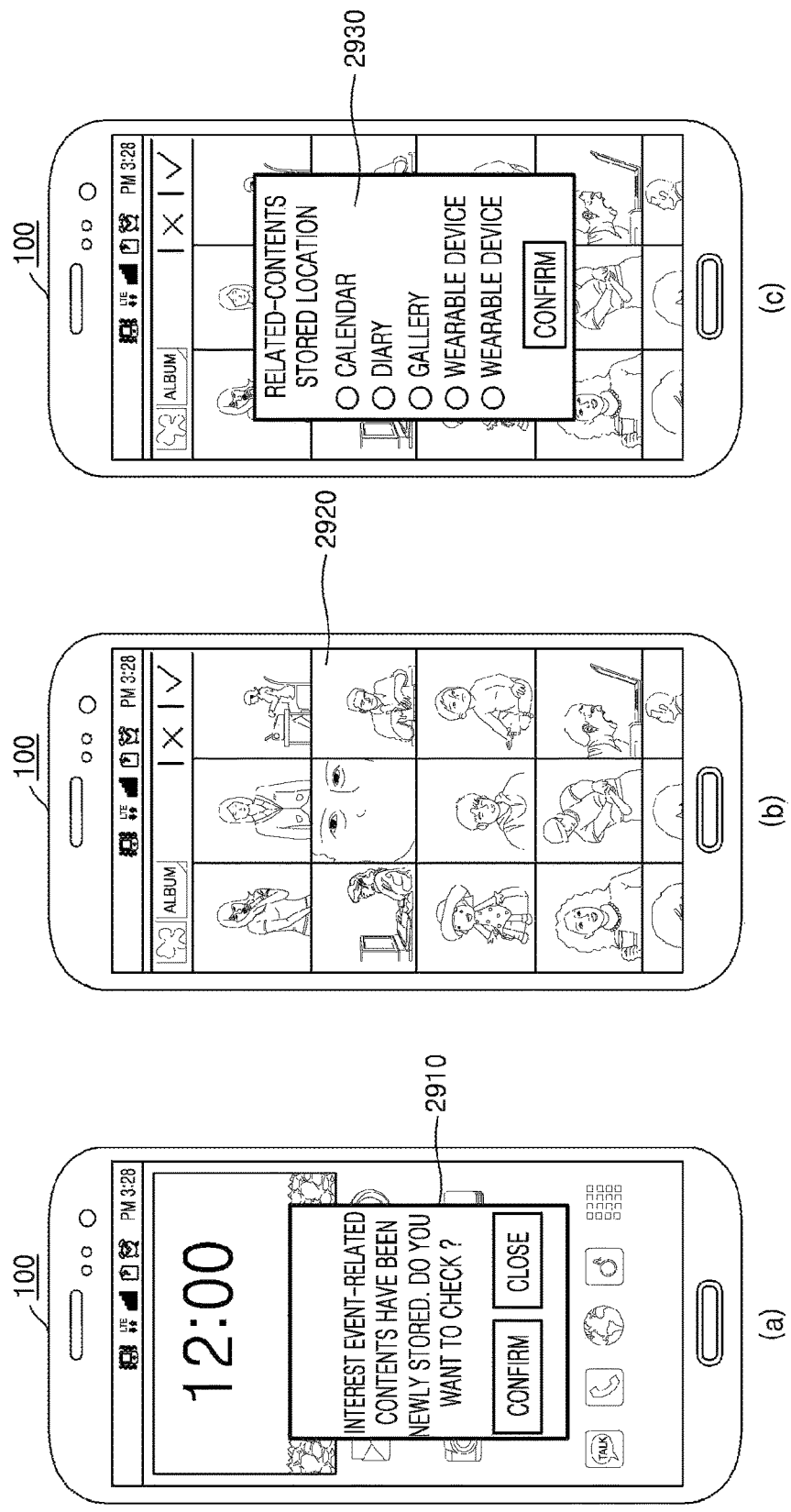

Referring to FIG. 29, when the first device 100 receives interest event-related multimedia information from the server 300, the first device 100 may selectively store received multimedia information.

Before the first device 100 stores the received multimedia information, the first device 100 may display the received multimedia information on the first device 100 to make a first device user determine appropriateness (whether it is multimedia information that the first device user desires to search for) of the received multimedia information, and when a storage request for the displayed multimedia information is received, the first device 100 may store the displayed multimedia information in the first device 100.

For example, as illustrated in part (a) of FIG. 29, when the interest event-related multimedia information is received, the first device 100 may display a notice message 2910 indicating that multimedia information has been received.

Here, when an input of selecting a confirm button included in the notice message 2910 is received, the first device 100 may display the received multimedia information.

As illustrated in part (b) of FIG. 29, the first device user may select at least one piece of multimedia information from among a plurality of pieces of displayed multimedia information 2920, and may input a request for storing the selected multimedia information. As illustrated in part (c) of FIG. 29, the first device user may select a storage location by using a selected multimedia storage location selection menu 2930.

The first device 100 may store, based on an input of the first device user, the selected multimedia information in a multimedia information management application such as a schedule management application (e.g., a calendar application), a diary application, or a gallery application, or may generate a new folder and may store the selected multimedia information in the generated folder. Alternatively, the first device 100 may store the selected multimedia information in a wearable device interoperating with the first device 100 or in a cloud server of the first device user.

Figure 30:
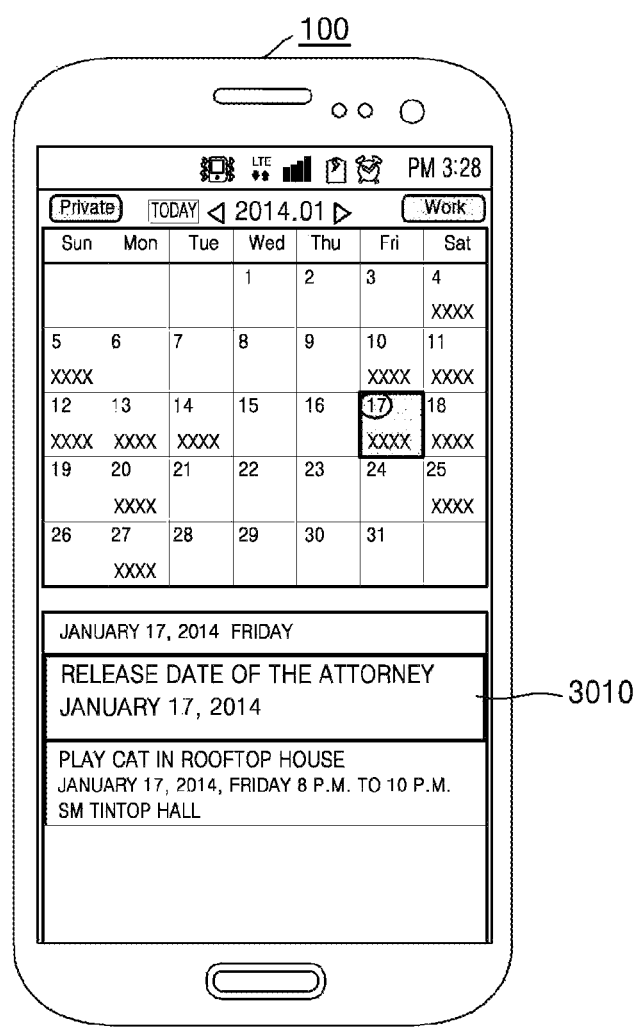

FIG. 30 is a diagram illustrating a method of storing multimedia information of a first device, according to an exemplary embodiment of the inventive concept.

When interest event-related multimedia information received from the server 300 includes time information, the first device 100 may store multimedia information by using a schedule management application (e.g., a calendar application).

For example, when a first device user sets a movie as an event of interest, the server 300 may search for, in the server 300, multimedia information related to a date such as a release date of the movie that is set as the event of interest, and may transmit the multimedia information to the first device 100.

Here, the first device 100 may receive the multimedia information related to the date, and may display the multimedia information on a schedule list of the date. For example, the first device 100 may display a movie release date 3010 on a schedule list corresponding to Jan. 14, 2014, that is the release date of the movie.

Figure 31:
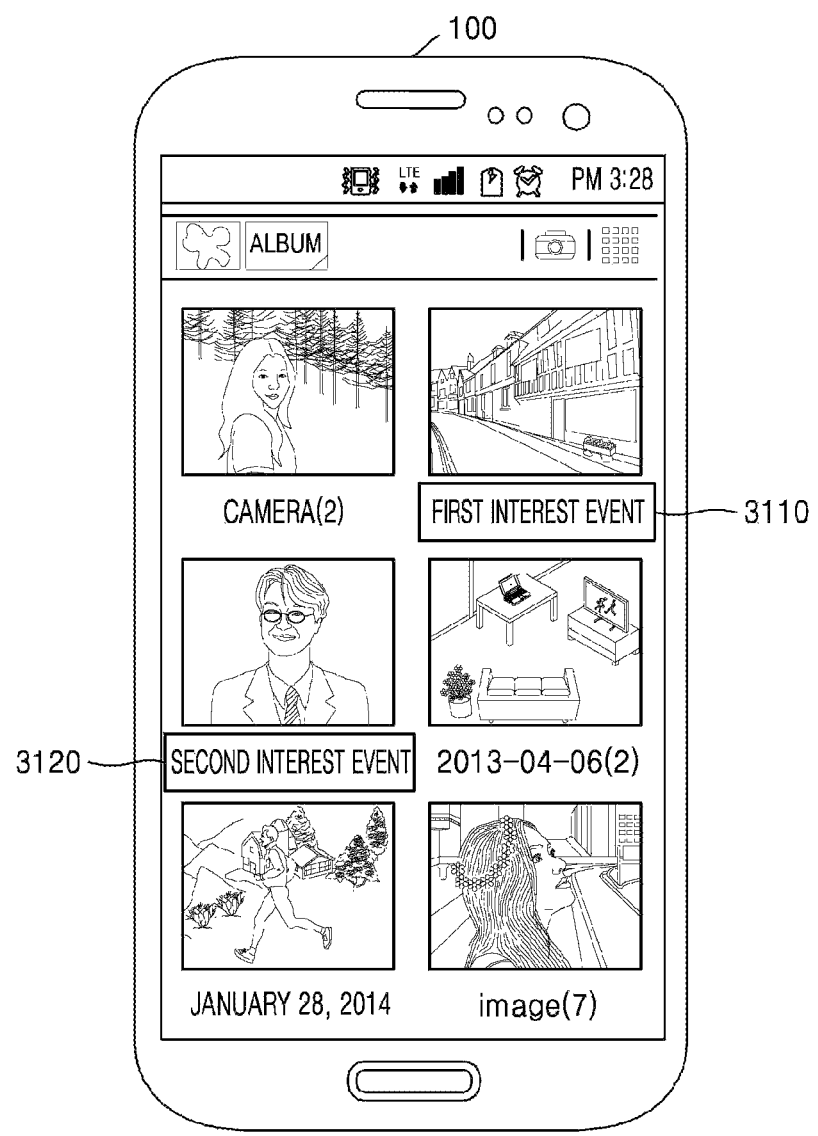

FIG. 31 is a diagram illustrating a method of storing multimedia information of a first device, according to an exemplary embodiment of the inventive concept.

The first device 100 may classify a plurality of pieces of interest event-related multimedia information, which are received from the server 300, according to events, and may store them. The first device 100 may generate folders according to the events, and may store corresponding event-related multimedia information in each of the folders.

For example, referring to FIG. 31, when the first device 100 receives a first interest event-related image and a second interest event-related image, the first device 100 may generate a first interest event folder 3110 and a second interest event folder 3120 in an image management application (e.g., a gallery application, etc.), and may store the first interest event-related image in the first interest event folder 3110 and may store the second interest event-related image in the second interest event folder 3120.

Referring to FIG. 31, it is described that the multimedia information is an image, but the inventive concept is not limited thereto, and even when the first device 100 receives an audio, a text, a moving picture, etc. that are related to a first interest event and a second interest event, the first device 100 may generate folders according to events in a corresponding multimedia information management application, and may store corresponding event-related multimedia information in each of the folders.

Figure 32:
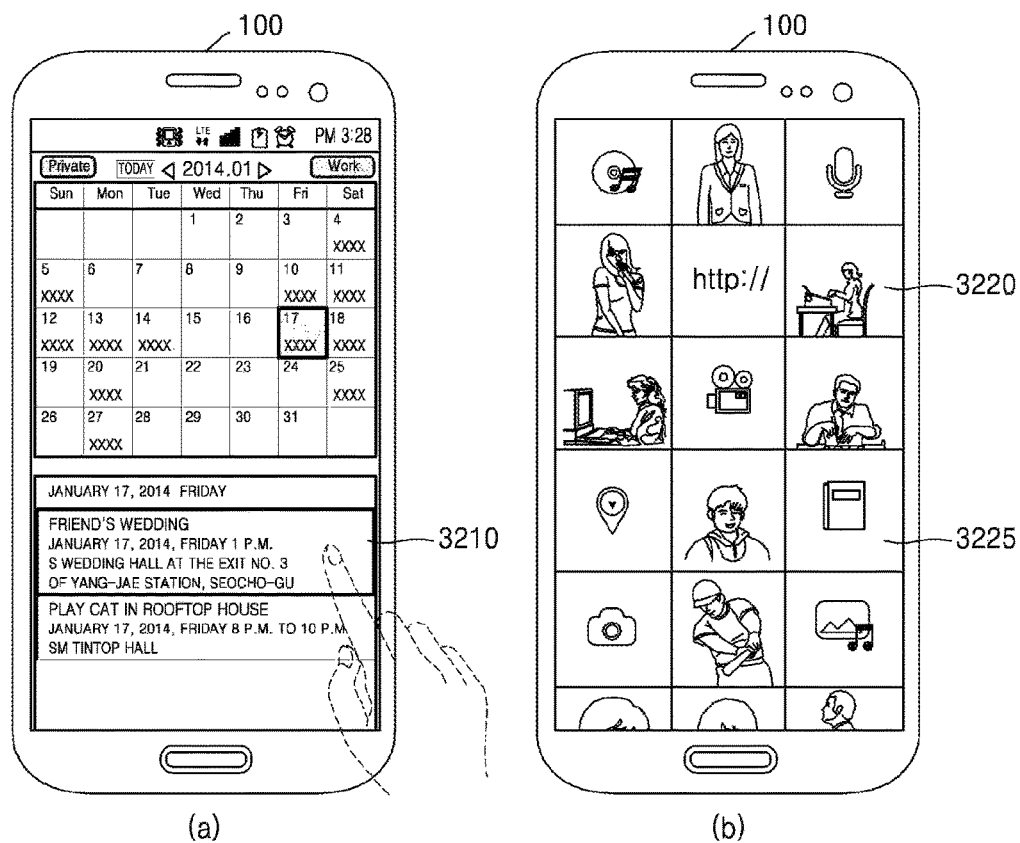

Referring to FIG. 32, the first device 100 according to the present exemplary embodiment of the inventive concept may classify a plurality of pieces of interest event-related multimedia information, which are received from the server 300, according to types of multimedia information, and may store them.

When the first device 100 receives new multimedia information about an event of interest related to a schedule, as illustrated in part (a) of FIG. 32, the first device 100 may store the received multimedia information while the received multimedia information is connected with a corresponding schedule list 3210, and may classify the received multimedia information according to the types of multimedia information and may store the received multimedia information.

When the corresponding schedule list 3210 is selected, as illustrated in part (b) of FIG. 32, the first device 100 may display a selection menu 3220 for selecting a type of multimedia information, and a first device user may select one of icons included in the selection menu 3220, and may check a type of multimedia information that corresponds to the selected icon.

Here, the multimedia information may be classified into a music file, a voice file, a URL, a movie file, map information, an image file, a moving picture file, a document file, etc. and the inventive concept is not limited thereto.

For example, when the first device user selects an icon 3225 indicating an image file, only an image file among the received multimedia information may be displayed.

Also, when an event of interest is related to a schedule, the first device 100 according to the present exemplary embodiment of the inventive concept may classify a plurality of pieces of received interest event-related multimedia information, which are received from the server 300, according to event participation, and may store them.

For example, the first device 100 may generate a participated event folder for storing multimedia information related an event in which the first device user participated, a not-participated event folder for storing multimedia information related a missed event in which the first device user did not participate, and a partially-participated event folder for storing multimedia information related an event in which the first device user partially participated, may classify a plurality of pieces of received multimedia information according to event participation, and may store them.

Figure 33:
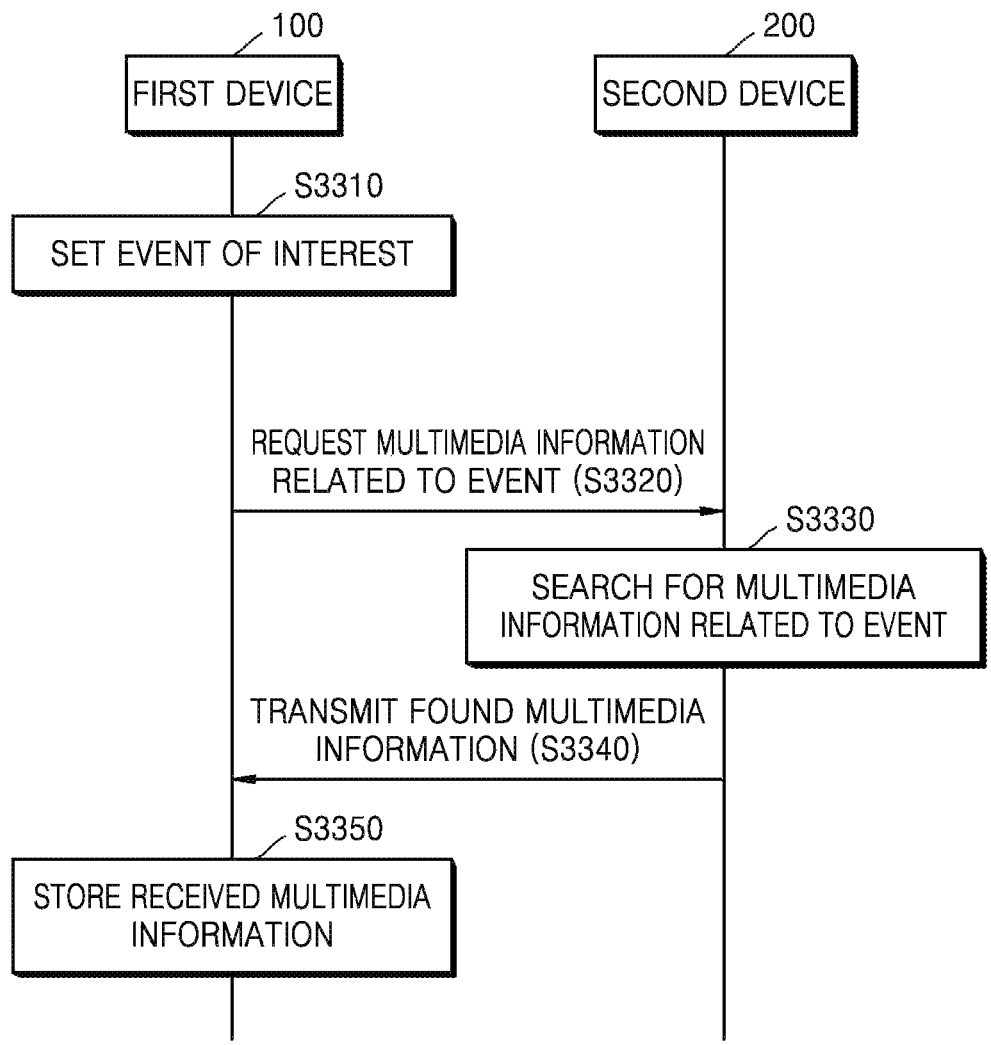
FIG. 33 is a flowchart illustrating a method of collecting multimedia information, the method being performed by a first device, according to an exemplary embodiment of the inventive concept.
Figure 34:
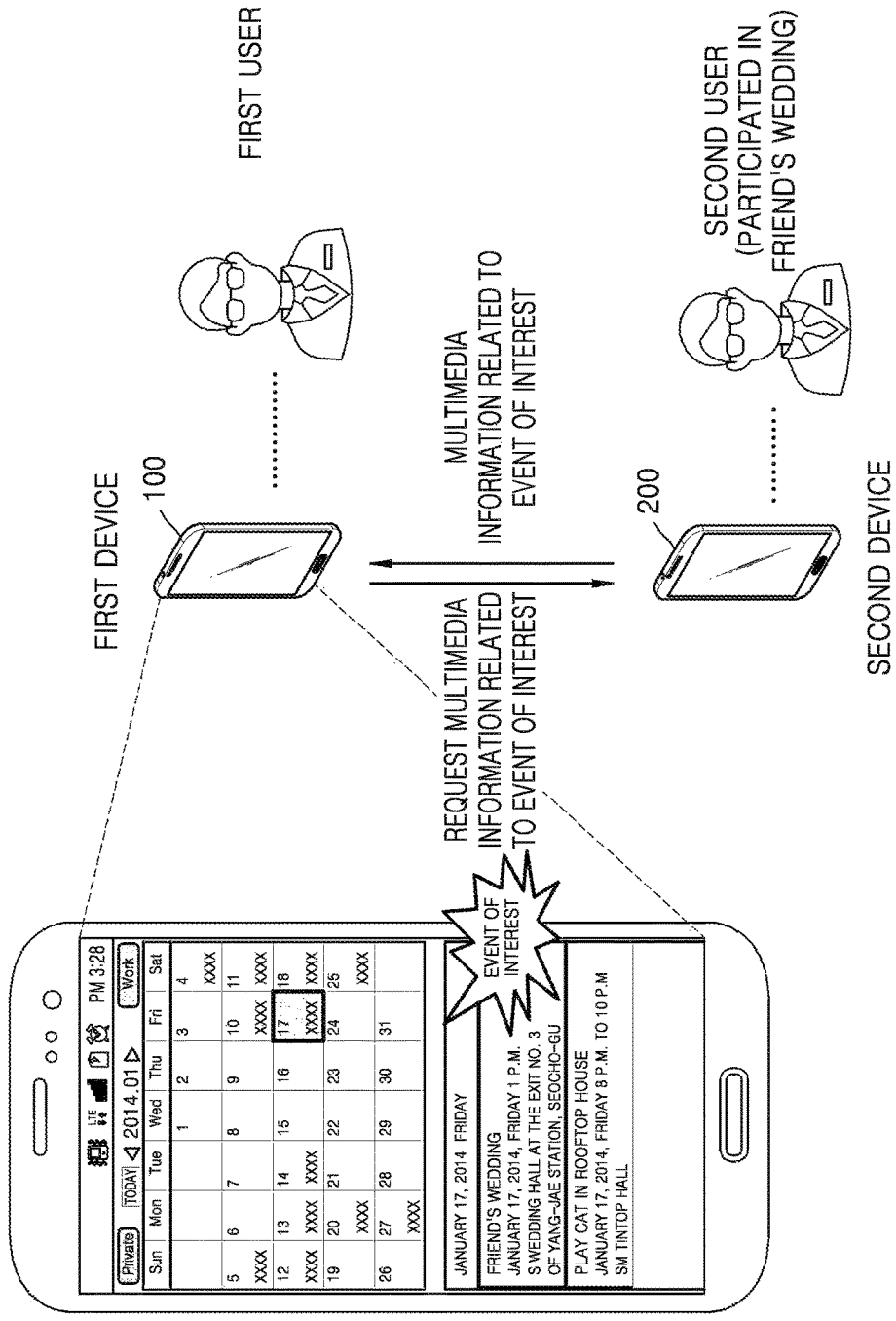
FIG. 34 is a diagram related to FIG. 33.

FIG. 33 is a flowchart illustrating a method of collecting multimedia information, the method being performed by a first device, according to an exemplary embodiment of the inventive concept, and FIG. 34 is a diagram related to FIG. 33.

Hereinafter, for convenience of description, it is assumed that the first device 100 is a device that requests interest event-related multimedia information, and the second device 200 is a device that provides the interest event-related multimedia information to the first device 100. However, the inventive concept is not limited thereto.

Referring to FIG. 33, the first device 100 according to the present exemplary embodiment of the inventive concept may set an event of interest (S3310). The event of interest may include all schedules registered in the first device 100 or all schedules received from an external device, or may include some schedules selected by a first device user from the registered or received schedules, and may include a schedule (a missed event) in which the first device user did not participate or a schedule in which the first device user participated. Alternatively, the event of interest may be irrelevant to a schedule and may include persons, contents, sports games, events, etc. that the first device user is interested in.

For example, the schedule registered in the first device 100 indicates a first device user's schedule that is registered in a PIMS application (e.g., a schedule management application) or a life-log application that manages personal information of the first device user.

Also, the schedule received from the external device may include a first device user's schedule that is registered in the external device, or a first device user's schedule that is extracted from the external device.

For example, the first device user's schedule that is extracted from an SNS server may include a schedule (e.g. a project meeting) that is extracted by analyzing information or a comment posted on the SNS server. Here, the information or the comment posted on the SNS server may include information linked to an SNS page of the first device user which is stored in the SNS server, or to a base page of an SNS. The information linked to the SNS page or the base page of the SNS may include another person's posted writing or another person's posted comment. Also, the SNS server may analyze the other person's posted writing or comment by a unit of a word and may extract the first device user's schedule.

Also, the SNS server may transmit, to the first device 100, information about the schedule that is registered in the SNS server or is extracted from the SNS server. The information about the schedule may include time information, location information, participant information, etc. of the schedule, and the first device 100 may detect, based on the received information about the schedule, whether the schedule is the missed event.

The first device 100 may detect a non-participation schedule, i.e., the missed event from among the schedules registered in the first device 100 and the schedules received from the external device, wherein the non-participation schedule indicates an event in which the first device user did not participate.

Hereinafter, for convenience of description, the schedules registered in the first device 100 are mainly described, but the inventive concept is not limited thereto, and thus descriptions below may be equally applied to the schedules received from the external device.

The missed event may be detected, based on a plurality of pieces of information (e.g., time information, location information, etc. about a first schedule) about the schedules registered in the first device 100, status information of the first device 100 (e.g., location information of the first device 100 according to time, etc.) sensed by the first device 100, multimedia information stored in the first device 100, or the like.

Because this is described in detail with reference to FIGS. 5 through 7, detailed descriptions thereof are omitted here.

When the missed event is detected, the first device 100 may set, as an event of interest, a schedule corresponding to the missed event.

In response to a request by the first device user, the first device 100 may set, as the event of interest, a schedule in which the first device user participated in. For example, when the first device user participated in the schedule but attempts to additionally collect multimedia information about the schedule, the corresponding schedule may be set as the event of interest.

The first device 100 may request the second device 200 for multimedia information related to the set event of interest (S3320).

Here, the first device 100 may select, as the second device 200, a device of a participant of the event of interest, based on participant information about the event of interest, or the first device 100 may select the second device 200 based on a user input.

For example, as illustrated in FIG. 34, when a friend's wedding schedule registered in a schedule management application of the first device 100 is set as the event of interest, the first device 100 may request multimedia information related to the friend's wedding from a device (a second device) of a second user who participated in the friend's wedding.

Here, when the first device user knows participants of the friend's wedding, the first device user may select a participant by using a contact information application, a messenger application, etc., and may request the multimedia information from a device of the participant.

Alternatively, the first device 100 may receive information about the participants of the friend's wedding from an SNS server or the like, may select at least one from among the participants of the friend's wedding, based on the received information about the participants, and may request the multimedia information from the device (the second device) of the selected participant. However, the inventive concept is not limited thereto.

Also, the first device 100 may transmit, to the second device 200, the request for the multimedia information and information about the event of interest. The information about the event of interest may include time information, location information, an event title, participant information, etc., of the event of interest.

For example, as illustrated in FIG. 34, when the event of interest is a friend's wedding, the information about the event of interest may include location information of a wedding (e.g., S Wedding Hall at exit no. 3 of Yang-jae station, Seocho-gu), time information of the wedding (wedding start time information and end time information, e.g., Jan. 14, 2011, Saturday, 1 p.m. to 3 p.m.), a name of the friend getting married, information about participants in the friend's wedding, etc.

Also, the first device 100 may set a range in which the interest event-related multimedia information is to be searched for, and may transmit the range to the second device 200.

The range may include a type of multimedia information to be searched for, a period in which the multimedia information is to be searched for, a generation time or generation location of the multimedia information to be searched for, an uploaded time or uploaded location of the multimedia information to be searched for, information about an object included in the multimedia information to be searched for, or the like.

Because this is described in detail with reference to FIGS. 24 through 26, detailed descriptions thereof are omitted here.

The second device 200 may search for the multimedia information related to the set event of interest only when the second device 200 allows an information search with respect to the first device 100 (S3330). However, the inventive concept is not limited thereto. Here, whether to allow the search for the information with respect to the first device 100 may be determined, based on a type of the event of interest and a search range of the multimedia information requested by the first device 100.

The second device 200 may transmit the found multimedia information to the first device 100 (S3340), and the first device 100 may automatically store the received multimedia information, or may store the received multimedia information according to a storage request by the first device user (S3350).

The first device 100 may store the received multimedia information to make the received multimedia information managed by a personal information management application installed in the first device 100. For example, the first device 100 may store the received multimedia information in the PIMS application or the life-log application, and manage the received multimedia information as life-log information of a first user.

Alternatively, the first device 100 may store the received multimedia information in a server or a cloud server.

The method of storing the received multimedia information, the method being performed by the first device 100, is described in detail with reference to FIGS. 28 through 32, and thus, detailed descriptions thereof are omitted here.

Figure 35:
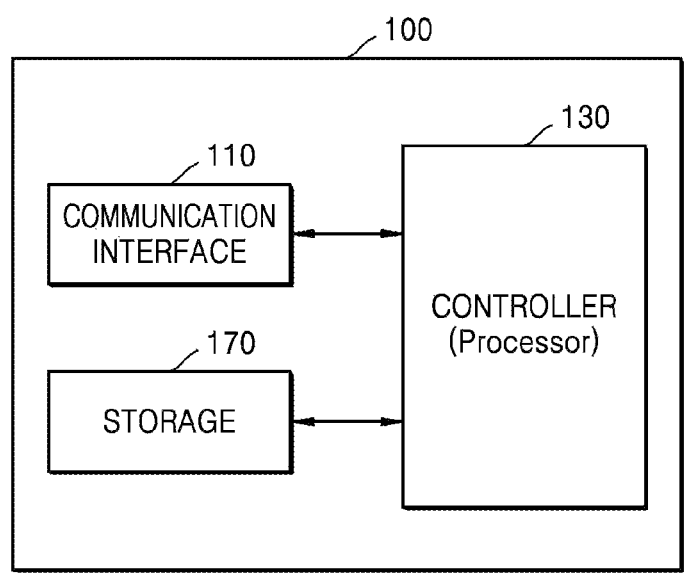
FIGS. 35 and 36 are block diagrams illustrating a configuration of a first device, according to exemplary embodiments of the inventive concept.
Figure 36:
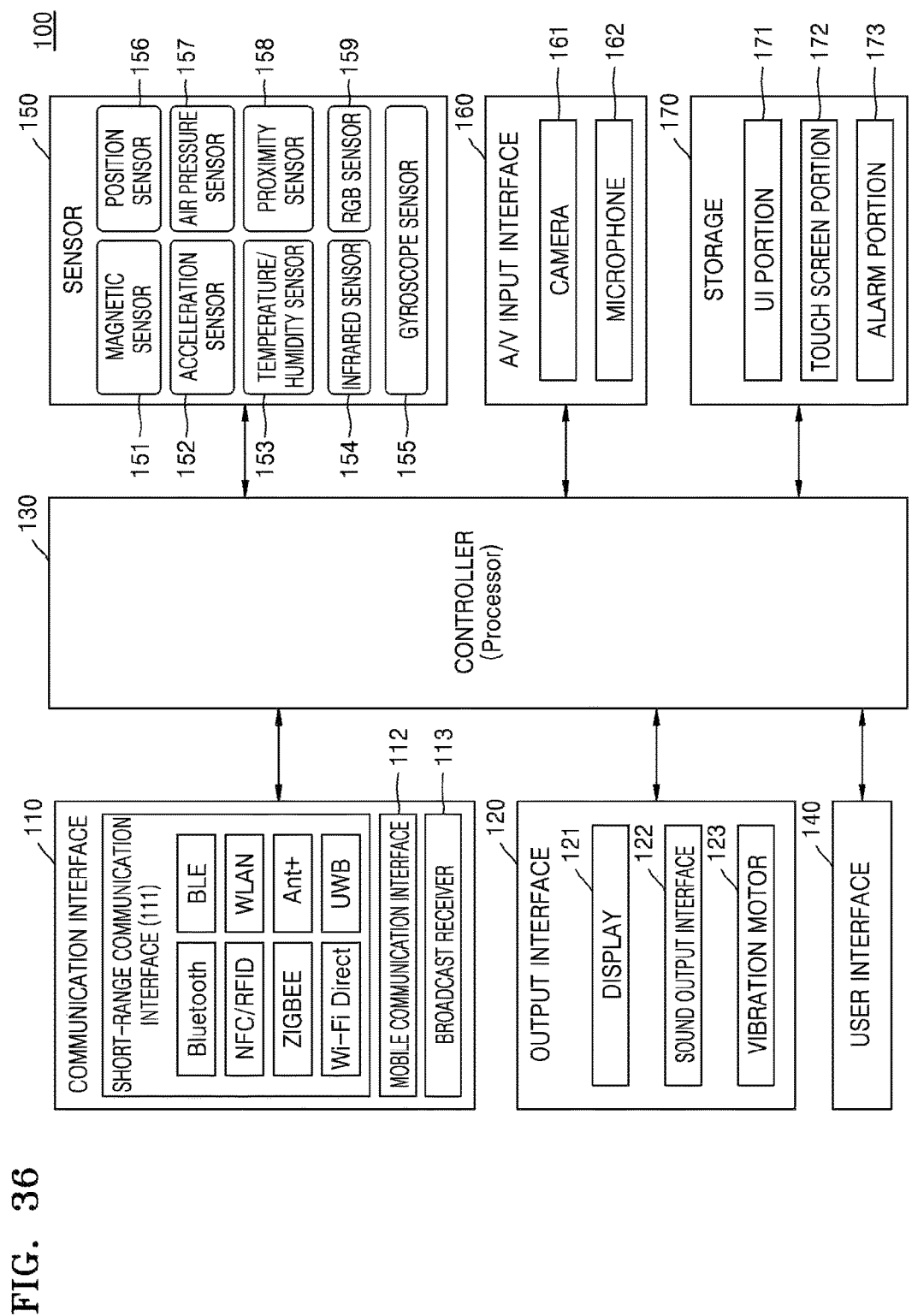

FIGS. 35 and 36 are block diagrams illustrating a configuration of a first device, according to exemplary embodiments of the inventive concept.

As illustrated in FIG. 35, according to the present exemplary embodiment of the inventive concept, the first device 100 may include a communication interface 110, a controller 130, and a storage 170. However, not all shown elements are necessary elements. The first device 100 may be embodied with less elements than the shown elements, or may be embodied with more elements than the shown elements.

For example, as illustrated in FIG. 36, the first device 100 according to the present exemplary embodiment of the inventive concept may further include an output interface 120, a user interface 140, a sensor 150, an audio/video (A/V) input interface 160, and a display 121, in addition to the communication interface 110, the storage 170, and the controller 130.

Hereinafter, the elements are sequentially described.

The communication interface 110 may include one or more elements allowing communication between the first device 100 and the second device 200 or between the first device 100 and the server 300. For example, the communication interface 110 may include a short-range communication interface 111, a mobile communication interface 112, and a broadcast receiver 113.

The short-range communication interface 111 may include a Bluetooth communication interface, a Bluetooth Low Energy (BLE) communication interface, a near field wireless communication interface, a wireless local area network (WLAN) communication interface, a ZigBee communication interface, an infrared Data Association (IrDA) communication interface, a Wi-Fi Direct (WFD) communication interface, an UWB communication interface, or an Ant+ communication interface, but the inventive concept is not limited thereto.

The mobile communication interface 112 exchanges a wireless signal with at least one selected from a base station, an external terminal, and the server 300 on a mobile communication network. The wireless signal may include various types of data according to communication in regard to a sound call signal, a video call signal, or a text/multimedia message.

The broadcast receiver 113 receives a broadcast signal and/or information related to broadcast from the outside through a broadcast channel. The broadcast channel may include a satellite channel and a ground wave channel. According to an exemplary embodiment, the first device 100 may not include the broadcast receiver 113.

The communication interface 110 may transmit, to the server 300, multimedia information stored in the storage 170. For example, the multimedia information may include a still image, a text, graphics, a sound, a moving picture, or an animation, but is not limited thereto.

Also, the communication interface 110 may transmit, to the server 300, first device user authentication information or first device identification information, and the user authentication information may include a user's ID, a user's password, a user's account, or the like.

The communication interface 110 may request the server 300 or the second device 200 for interest event-related multimedia information, and when an event of interest is detected, the communication interface 110 may automatically request the server 300 for multimedia information related to the event of interest. Also, the communication interface 110 may also transmit information related to the event of interest.

The communication interface 110 may receive found interest event-related multimedia information from the server 300, and may receive participant information of the event of interest.

The communication interface 110 may transmit, to the server 300, identification information of the other device that is set as a target device in which the multimedia information related to the event of interest is to be searched for.

The output interface 120 may output an audio signal, a video signal, or a vibration signal and may include the display 121, a sound output interface 122, a vibration motor 123, or the like.

The display 121 displays and outputs information that is processed in the first device 100. For example, the display 121 may display the interest event-related multimedia information received from the server 300, and may display the participant information of the event of interest. Also, when the multimedia information is received from the server 300, the display 121 may display a notice message.

When the display 121 and a touch pad form a mutual layer structure and then are formed as a touch screen, the display 121 may be used as both an output device and input device. The display 121 may include at least one of a liquid crystal display (LCD), a thin film transistor-liquid crystal display (TFT-LCD), an organic light-emitting diode (OLED) display, a flexible display, a three-dimensional (3D) display, and an electrophoretic display. Also, according to a type of the first device 100, the first device 100 may include at least two displays 121.

The sound output interface 122 may output audio data that is received from the communication interface 110 or is stored in the storage 170. The sound output interface 122 may also output a sound signal (e.g., a call signal receiving sound, a message receiving sound, a notifying sound, or the like) related to capabilities performed by the first device 100. The sound output interface 122 may include a speaker, a buzzer, or the like.

The vibration motor 123 may output a vibration signal. For example, the vibration motor 123 may output the vibration signal that corresponds to an output of the audio data (e.g., the call signal receiving sound, the message receiving sound, or the like) or video data. Also, when a touch is input to the touch screen, the vibration motor 123 may output a vibration signal.

The controller 130 may control all operations of the first device 100. For example, the controller 130 may control the communication interface 110, the output interface 120, the user interface 140, the sensor 150, the A/V input interface 160, etc. by executing programs stored in the storage 170.

The controller 130 may detect, from among schedules registered in the first device 100 or schedules received from an external device, a missed event in which a first device user did not participate. Here, the controller 130 may extract time information and location information about the schedules registered in the first device 100 or the schedules received from the external device, may compare the extracted time information and the extracted location information with location information of the first device 100 according to time, and thus may detect the missed event.

Also, the controller 130 may detect the missed event, based on multimedia information related to a life-log of the first device user.

Also, when life-log information of the first device user is displayed on the display 121, the controller 130 controls, via a preset application, the interest event-related multimedia information received from the server 300 to be displayed based on time information of the event of interest.

The user interface 140 may be an apparatus by which a user inputs data to control the first device 100. For example, the user interface 140 may include a key pad, a dome switch, a touch pad (a touch capacitive-type touch pad, a pressure resistive-type touch pad, an infrared beam sensing-type touch pad, a surface acoustic wave-type touch pad, an integral strain gauge-type touch pad, a piezoelectric effect-type touch pad, or the like), a jog wheel, a jog switch, etc., but the inventive concept is not limited thereto.

The user interface 140 may receive an input of the identification information of the other device in which the multimedia information related to the event of interest is to be searched for. For example, a name, a nickname, a picture, a telephone number, or an email address of the other party may be input.

The user interface 140 may receive selection of the multimedia information to be stored as life-log information of the first device user, wherein the multimedia information is from among the multimedia information displayed on the display 121.

The sensor 150 may sense a state of the first device 100 or a status around the first device 100, and may transfer sensed information to the controller 130.

The sensor 150 may include at least one selected from a magnetic sensor 151, an acceleration sensor 152, a temperature/humidity sensor 153, an infrared sensor 154, a gyroscope sensor 155, a position sensor (e.g., GPS) 156, an air pressure sensor 157, a proximity sensor 158 and an RGB sensor (i.e., a luminance sensor) 159, but the inventive concept is not limited thereto. Functions of the sensors may be intuitionally deduced by one of ordinary skill in the art by based on the names of the sensors, and thus, detailed descriptions thereof are omitted here.

The sensor 150 may detect a location of the first device 100 by using a position sensor.

The A/V input interface 160 may receive an input of an audio signal or a video signal and may include a camera 161 and a microphone 162. The camera 161 may obtain an image frame such as a still image or a moving picture via an image sensor during a video call mode or an image-capturing mode. An image that is captured via the image sensor may be processed by the controller 130 or a separate image processor (not shown).

The image frame that is processed by the camera 161 may be stored in the storage 170 or may be transmitted to an external source via the communication interface 110. According to a configuration of the first device 100, two or more cameras 161 may be arranged.

The microphone 162 receives an external sound signal as an input and processes the received sound signal into electrical voice data. For example, the microphone 162 may receive a sound signal from an external device or a speaker. To remove noise that occurs while the sound signal is externally input, the microphone 162 may use various noise removing algorithms.

The storage 170 may store a program for processing and controlling the controller 130, and a plurality of pieces of input/output data.

The storage 170 may include a storage medium of at least one type selected from a flash memory, a hard disk, a multimedia card type memory, a card type memory such as an SD or XD card memory, random access memory (RAM), static random access memory (SRAM), read-only memory (ROM), electrically erasable programmable read-only memory (EEPROM), programmable read-only memory (PROM), a magnetic memory, a magnetic disc, and an optical disc. Also, the first device 100 may run a web storage or a cloud server that performs a storage function of the storage 170 on the Internet.

The storage 170 may store the multimedia information, which is received from the server 300, as life-log information of the first device user. For example, the storage 170 may store the received multimedia information in a PIMS application or a life-log application, and may manage the received multimedia information as the life-log information of the first device user.

The programs stored in the storage 170 may be classified into a plurality of portions according to their functions, for example, a user interface (UI) portion 171, a touch screen portion 172, an alarm portion 173, etc.

The UI portion 171 may provide a specialized UI or a graphical user interface (GUI) in connection with the first device 100 for each application. The touch screen portion 172 may detect a user's touch gesture on a touch screen and transmit information related to the touch gesture to the controller 130. The touch screen portion 172 according to the present exemplary embodiment of the inventive concept may recognize and analyze a touch code. The touch screen portion 172 may be configured by using additional hardware including a controller.

Various sensors may be arranged in or near the touch screen to detect a touch or a proximate touch on the touch sensor. An example of the sensor to detect the touch on the touch screen may include a tactile sensor. The tactile sensor detects a contact of an object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or exists nearby by using a force of an electro-magnetic field or an infrared ray, instead of a mechanical contact. Examples of the proximity sensor include a transmission-type photoelectric sensor, a direction reflection-type photoelectric sensor, a minor reflection-type photoelectric sensor, a high frequency oscillation-type proximity sensor, a capacity-type proximity sensor, a magnetic proximity sensor, an infrared-type proximity sensor, or the like. The touch gesture (i.e., an input) of the user may include a tap gesture, a touch & hold gesture, a double tap gesture, a drag gesture, a panning gesture, a flick gesture, a drag & drop gesture, a swipe gesture, or the like.

The alarm portion 173 may generate a signal for notifying an occurrence of an event in the first device 100. Examples of the event that occurs in the first device 100 may include a call signal reception, a message reception, a key signal input, schedule notification, or the like. The alarm portion 173 may output a video-format alarm signal via the display 121, may output an audio-format alarm signal via the sound output interface 122, or a vibration signal via the vibration motor 123.

The alarm portion 173 may generate a signal for notifying that the first device 100 has received the multimedia information.

Figure 37:
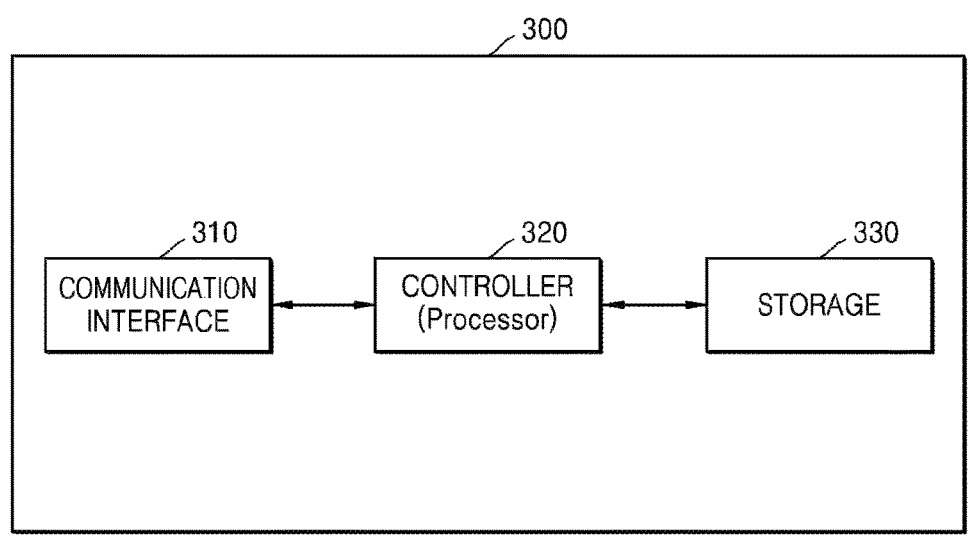
FIG. 37 is a block diagram illustrating a configuration of a server, according to an exemplary embodiment of the inventive concept.

FIG. 37 is a block diagram illustrating a configuration of a server, according to an exemplary embodiment of the inventive concept.

As illustrated in FIG. 37, the server 300 according to the present exemplary embodiment of the inventive concept may include a communication interface 310, a controller 320, and a storage 330. However, not all shown elements are necessary elements. The server 300 may be embodied with less elements than the shown elements, or may be embodied with more elements than the shown elements.

Hereinafter, the elements are sequentially described.

The communication interface 310 may include one or more elements allowing communication between the server 300 and the first device 100 or between the server 300 and the second device 200. The communication interface 310 may include a receiver and a transmitter.

The receiver may receive multimedia information from the first device 100 or the second device 200.

Also, the receiver may receive, from the first device 100, a request for interest event-related multimedia information, and may also receive information about an event of interest.

The transmitter may transmit found interest event-related multimedia information from the first device 100 to the server 300.

The controller 320 may control all operations of the server 300. For example, when the interest event-related multimedia information is requested by the first device 100, the controller 320 may search for the interest event-related multimedia information.

The controller 320 may search for the interest event-related multimedia information, based on the information about the event of interest. For example, the information about the event of interest may include time information of the event of interest, location information of the event of interest, a title of the event of interest, participant information, etc., and the controller 320 may search for multimedia information by using, as search words, the title, the time information, the location information, etc. of the event of interest.

Alternatively, the controller 320 may search for, based on the participant information of the event of interest, the interest event-related multimedia information within multimedia information (multimedia information of a participant of the event of interest that is received from a device of the participant who participated in the event of interest.

Also, the controller 320 may recognize a person, a building, a character, etc. included in multimedia information stored in the server 300, may analyze whether the recognized person, the recognized building, or the recognized character is related to a missed event, and may search for multimedia information related to the missed event.

Also, the controller 320 may search for the multimedia information related to the missed event by using metadata of the multimedia information stored in the server 300.

The storage 330 may store a program for processing and controlling the controller 320, and a plurality of pieces of input/output data. For example, the server 300 may have a contact information database (DB), a social media information DB, or the like. Information of contacts of devices may be stored in the contact information DB. Information about social friends of users may be stored in the social media information DB.

Also, the storage 330 may store multimedia information received from external devices. Here, the storage 330 may match the received multimedia information with identification information of the external device and may store the received multimedia information.

One or more exemplary embodiments of the inventive concept may also be embodied as programmed commands to be executed in various computer apparatuses, and then may be recorded to a computer-readable recording medium. The computer-readable recording medium may include one or more of the programmed commands, data files, data structures, or the like. The programmed commands recorded to the computer-readable recording medium may be designed or configured for one or more exemplary embodiments of the inventive concept or may be well known to one of ordinary skill in the art. Examples of the computer-readable recording medium include magnetic media including hard disks, magnetic tapes, and floppy disks, optical media including CD-ROMs and DVDs, magneto-optical media including floptical disks, and a hardware apparatus designed to store and execute the programmed commands in ROM, RAM, a flash memory, and the like. Examples of the programmed commands include not only machine codes generated by a compiler but also include great codes to be executed in a computer by using an interpreter. The hardware apparatus may be configured to function as one or more software modules to perform operations of one or more exemplary embodiments of the inventive concept, or vice versa.

While the inventive concept has been shown and described with reference to exemplary embodiments thereof, it will be understood that various changes in form and details may be made therein without departing from the spirit and scope of the following claims.

The invention claimed is:

1. A device comprising:
a memory that stores at least a schedule of a first user, the schedule comprising one or more events;
a communication interface configured to communicate with one or more external devices; and
a controller configured to:
determine whether the first user participated in a scheduled event that ended;
based on determining that the first user did not participate in the scheduled event that ended, which is a missed event, transmit, to an external device via the communication interface, a request for multimedia data related to the missed event, the request for the multimedia data related to the missed event including time information of the missed event; and
based on receipt of the multimedia data related to the missed event that is transmitted from the external device responsive to the request for the multimedia data, store or display the received multimedia data related to the missed event that was transmitted from the external device, the received multimedia data being information from a second user that is different from the first user.

2. The device of claim 1, wherein the missed event is at least one of an event in which the first user did not participate in at all or an event in which the first user partially participated in.

3. The device of claim 2, wherein the controller is further configured to:
determine time information and location information of the one or more events; and
compare the time information and the location information of the one or more events with time information and location information of the first user to determine the scheduled event in which the first user did not participate.

4. The device of claim 2, wherein the controller is further configured to:
determine overlapping events among the one or more events comprised in the stored schedule or among at least one event comprised in a schedule that is received from the external device; and
determine, among the overlapping events, the scheduled event in which the first user did not participate.

5. The device of claim 2, wherein the controller is further configured to:
receive, via the communication interface from the external device, participant information of the scheduled event in which the user did not participate, and
cause the display to display the received participant information.

6. The device of claim 2, wherein the controller is further configured to:
receive an input selection of identification information of another device in which the multimedia data of the scheduled event in which the user did not participate is to be searched, and
cause the communication interface to transmit the identification information of the other device to the external device, wherein the received multimedia data is found among multimedia data that is transmitted from the other device to the external device.

7. The device of claim 1, further comprising: the display, wherein the controller is further configured to:
cause the display to display a user interface configured to receive an input selection of a piece of the displayed multimedia data, and
store the selected piece of the displayed multimedia data in the memory.

8. The device of claim 1, wherein the memory stores multimedia data of the first user, and the controller is further configured to provide the stored multimedia data.

9. A method of collecting multimedia data, the method being performed by a device, the method comprising:
storing a schedule of a first user, the schedule comprising one or more events;
determining whether the first user participated in a scheduled event that ended;
based on determining that the first user did not participate in the scheduled event that ended, which is a missed event, transmitting, to an external device, a request for multimedia data related to the missed event, the request for the multimedia data related to the missed event including time information of the missed event; and
based on receipt of the multimedia data related to the missed event that is transmitted from the external device responsive to the request for the multimedia data, storing or displaying the received multimedia data related to the missed event that was transmitted from the external device, the received multimedia data being information from a second user that is different from the first user.

10. The method of claim 9, wherein the missed event is at least one of an event in which the first user did not participate in at all or an event in which the first user partially participated in.

11. The method of claim 10, further comprising:
determining time information and location information of the one or more events; and comparing the time information and the location information of the one or more events with time information and location information of the first user to determine the scheduled event in which the first user did not participate.

12. The method of claim 10, further comprising:
determining overlapping events among the one or more events in the stored schedule or among at least one event comprised in a schedule that is received from the external device; and
determining, among the overlapping events, the scheduled event in which the first user did not participate.

13. The method of claim 10, further comprising:
receiving, from the external device, participant information of the scheduled event in which the user did not participate; and
displaying the participant information.

14. The method of claim 10, further comprising:
receiving an input selection of identification information of another device in which the multimedia data of the scheduled event in which the user did not participate is to be searched for; and
transmitting the identification information of the other device to the external device, wherein the received multimedia data is found among multimedia data that is transmitted from the other device to the external device.

15. The method of claim 9, further comprising:
displaying the received multimedia data;
receiving an input selection of a piece of the displayed multimedia data; and
storing the selected piece of the displayed multimedia data.

16. The method of claim 9, further comprising:
storing multimedia data of the first user; and
providing the stored multimedia data.

17. A non-transitory computer-readable recording medium having recorded thereon a program, which, when executed by a computer, causes the computer to perform a method of collecting multimedia data, the method of collecting the multimedia data comprising:
storing a schedule of a first user, the schedule comprising one or more events;
based on determining that the first user did not participate in the scheduled event that ended, which is a missed event, transmitting, to an external device, a request for multimedia data related to the missed event, the request for the multimedia data related to the missed event including time information of the missed event; and
based on receipt of the multimedia data related to the missed event that is transmitted from the external device responsive to the request for the multimedia data, storing or displaying the received multimedia data related to the missed event that was transmitted from the external device, the received multimedia data being information from a second user that is different from the first user.

18. A device comprising:
a communication interface configured to communicate with one or more external devices; and
a controller configured to:
determine whether a first user participated in a scheduled event that ended;
based on determining that the first user did not participate in the scheduled event that ended, which is a missed event:
set a range in which multimedia data related to the missed event is to be searched for; and
transmit, to an external device via the communication interface, a request for the multimedia data related to the missed event of the first user, the request for the multimedia data related to the missed event of the first user including the set range in which the multimedia data related to the missed event is to be searched; and
based on receipt of the multimedia data related to the missed event that is found in the set range that is transmitted from the external device responsive to the request for the multimedia data, store or display the received multimedia data related to the missed event that was transmitted from the external device, the received multimedia data being information from a second user that is different from the first user.

19. The device of claim 18, wherein the controller is further configured to select the missed event based on an input selection of the first user.

20. The device of claim 18, wherein the range comprises at least one of identification information of another device in which the multimedia data is to be searched for, a type of the multimedia data, a period of time of the multimedia data, location information of the missed event, or a person comprised in the multimedia data.

* * * * *